(12) United States Patent
Shirokawa et al.

(10) Patent No.: US 11,852,950 B2
(45) Date of Patent: Dec. 26, 2023

(54) LIGHT BEAM DIRECTION CONTROL ELEMENT, DISPLAY DEVICE, AND METHOD FOR MANUFACTURING LIGHT BEAM DIRECTION CONTROL ELEMENT

(71) Applicant: TIANMA JAPAN, LTD., Kanagawa (JP)

(72) Inventors: Masanori Shirokawa, Kanagawa (JP); Mamoru Okamoto, Kanagawa (JP)

(73) Assignee: TIANMA JAPAN, LTD., Kanagawa (JP)

(*) Notice: Subject to any disclaimer, the term of this patent is extended or adjusted under 35 U.S.C. 154(b) by 0 days.

(21) Appl. No.: 18/185,761

(22) Filed: Mar. 17, 2023

(65) Prior Publication Data

US 2023/0314897 A1 Oct. 5, 2023

(30) Foreign Application Priority Data

Mar. 31, 2022 (JP) .................................. 2022-058156
Nov. 30, 2022 (JP) .................................. 2022-191434

(51) Int. Cl.
*G02F 1/29* (2006.01)
(52) U.S. Cl.
CPC ...................................... *G02F 1/29* (2013.01)
(58) Field of Classification Search
CPC ........... G02F 1/167; G02F 1/29; G02F 1/1676
See application file for complete search history.

(56) References Cited

U.S. PATENT DOCUMENTS

| 11,448,908 | B1* | 9/2022 | Fan Jiang | G02F 1/133526 |
| 2013/0308175 | A1* | 11/2013 | Yasui | B29C 35/0888 359/296 |
| 2016/0077363 | A1* | 3/2016 | Shiota | G02F 1/1676 349/61 |
| 2017/0010516 | A1 | 1/2017 | Shiota | |

FOREIGN PATENT DOCUMENTS

JP 2013-041036 A 2/2013
JP 6443691 B2 12/2018

* cited by examiner

*Primary Examiner* — Anne M Hines
(74) *Attorney, Agent, or Firm* — Sughrue Mion, PLLC

(57) ABSTRACT

A light beam direction control element includes light transmission regions interposed between a first light transmission substrate and a second light transmission substrate, light absorption regions located between the light transmission regions, a light transmission dispersion medium enclosed in the light absorption regions, and electrophoretic particles dispersed in the light transmission dispersion medium. The light transmission regions include a first light transmission region extending from the first light transmission substrate toward the second light transmission substrate, and a second light transmission region extending from the first light transmission region toward the second light transmission substrate. A height of the first light transmission region is lower than a height of the second light transmission region and a width of the first light transmission region is wider than a width of the second light transmission region.

9 Claims, 20 Drawing Sheets

FIG.19

| H2(μm) \ n | 1.40 | 1.42 | 1.50 | 1.58 | 1.60 |
|---|---|---|---|---|---|
| 80 | 32 | 32 | 34 | 36 | 37 |
| 75 | 33 | 34 | 36 | 38 | 39 |
| 70 | 35 | 35 | 38 | 40 | 41 |
| 65 | 37 | 37 | 40 | 42 | 43 |
| 60 | 39 | 39 | 42 | 45 | 46 |
| 50 | 44 | 44 | 48 | 51 | 52 |

MAXIMUM EMISSION ANGLE θ1 (deg.)

LIGHT BEAM DIRECTION CONTROL ELEMENT, DISPLAY DEVICE, AND METHOD FOR MANUFACTURING LIGHT BEAM DIRECTION CONTROL ELEMENT

CROSS-REFERENCE TO RELATED APPLICATION

This application claims the benefit of Japanese Patent Application No. 2022-058156, filed on Mar. 31, 2022, and Japanese Patent Application No. 2022-191434, filed on Nov. 30, 2022, of which the entity of the disclosures is incorporated by reference herein.

FIELD

This application relates generally to a light beam direction control element, a display device, and a method for manufacturing the light beam direction control element.

BACKGROUND

A light beam direction control element that controls an emission range of transmitted light is known. For example, Japanese Patent No. 6443691 discloses an optical element including first and second transparent substrates disposed with respective main surfaces facing each other, a conductive light shielding pattern disposed on the first transparent substrate, a transparent conductive film disposed on the second transparent substrate, a plurality of light transmission regions disposed on the first transparent substrate, and electrophoretic elements disposed between adjacent light transmission regions and including light shielding electrophoretic particles and a transmissive dispersant. In the optical element disclosed in Japanese Patent No. 6443691, by adjusting the potential difference between the conductive light shielding pattern and the transparent conductive film, the dispersion state of the electrophoretic particles is changed, resulting in a change in the emission range of light transmitted through the light transmission regions and the dispersant.

In the optical element disclosed in Japanese Patent No. 6443691, a wide field-of-view state (wide emission range) is achieved by aggregating the electrophoretic particles in the vicinity of the conductive light shielding pattern. In the wide field-of-view state, the transmittance of the optical element needs to be further increased. In the wide field-of-view state, in order to further increase the transmittance of the optical element, an aperture ratio of the optical element is increased in the wide field-of-view state by narrowing a region (that is, an interval between the light transmission regions) where the electrophoretic particles are aggregated.

On the other hand, in order to change the emission range of light, the light transmission region also needs to be formed at a high aspect ratio. In Japanese Patent No. 6443691, since the light transmission region is formed from resin (photoresist) having photosensitivity, forming a light transmission region having a high aspect ratio at narrower intervals is difficult.

SUMMARY

A light beam direction control element according to a first aspect includes
a first light transmission substrate including a first light transmission electrode on a main surface,
a second light transmission substrate facing the first light transmission substrate and including a second light transmission electrode on a main surface facing the main surface of the first light transmission substrate,
a plurality of light transmission regions arranged in a predetermined direction and interposed between the first light transmission substrate and the second light transmission substrate,
a plurality of light absorption regions located between the light transmission regions,
a light transmission dispersion medium enclosed in the light absorption regions; and
electrophoretic particles absorbing light, dispersed in the light transmission dispersion medium, and having a dispersion state changed by an applied voltage, wherein
each of the light transmission regions includes a first light transmission region extending perpendicularly to the main surface of the first light transmission substrate from the main surface of the first light transmission substrate toward the second light transmission substrate and a second light transmission region extending perpendicularly to the main surface of the first light transmission substrate from an upper surface of the first light transmission region toward the second light transmission substrate,
each of the light absorption regions includes a first light absorption region located between the first light transmission regions and a second light absorption region located between the second light transmission regions,
a height of the first light transmission region from the main surface of the first light transmission substrate is lower than a height of the second light transmission region from the upper surface of the first light transmission region, and
when viewed in a cross section including the predetermined direction and perpendicular to the main surface of the first light transmission substrate, a width of the first light transmission region is wider than a width of the second light transmission region.

A display device according to a second aspect includes
the light beam direction control element, and
a display panel,
wherein the light beam direction control element is disposed on a display surface of the display panel.

A display device according to a third aspect includes
the light beam direction control element,
a transmissive liquid crystal display panel, and
a backlight disposed on an opposite side of a display surface of the transmissive liquid crystal display panel and supplying light to the transmissive liquid crystal display panel,
wherein the light beam direction control element is disposed between the transmissive liquid crystal display panel and the backlight.

A method for manufacturing a light beam direction control element according to a fourth aspect includes
preparing a mold including a mold substrate, a plurality of first pillars provided on a main surface of the mold substrate perpendicularly to the main surface and arranged in a predetermined direction, and a second pillar provided on an upper surface of each of the plurality of first pillars perpendicularly to the main surface of the mold substrate,
filling the mold with light transmission resin,
pressing a main surface of a first light transmission substrate against the second pillars and the light transmission resin exposed from between the second pillars, the first light transmission substrate including a first light transmission electrode on the main surface of the first light transmission substrate, curing the light transmission resin pressed against the main surface of the first light transmission substrate, releasing the mold from the cured light transmission resin and forming a plurality of light transmission layers on the main surface of the first light transmission substrate, the plurality of light transmission layers including a first light transmission layer having a shape corresponding to a shape of a space between the adjacent second pillars and a second light transmission layer having a shape corresponding to a shape of a space between the adjacent first pillars, press-fitting a second light transmission substrate facing the first light transmission substrate onto the plurality of light transmission layers, the second light transmission substrate including a second light transmission electrode on a main surface facing the main surface of the first light transmission substrate, and filling a light transmission dispersion medium including dispersed electrophoretic particles between the light transmission layers, the electrophoretic particles absorbing light and having a dispersion state changed by an applied voltage, wherein a height of the space between the adjacent second pillars is lower than a height of the space between the adjacent first pillars, and when viewed in a cross section including the predetermined direction and perpendicular to the main surface of the mold substrate, a width of the space between the adjacent second pillars is wider than a width of the space between the adjacent first pillars.

A method for manufacturing a light beam direction control element according to a fifth aspect includes forming light shielding layers on a main surface of a first light transmission substrate at a predetermined interval, the first light transmission substrate including a first light transmission electrode on the main surface, stacking, on the main surface of the first light transmission substrate, a first layer with a predetermined first thickness, the first layer being made of a light transmission material having photosensitivity and covering the light shielding layers, exposing the first layer from a side of the first light transmission substrate, stacking, on the exposed first layer, a second layer with a predetermined second thickness thicker than the predetermined first thickness, the second layer being made of a light transmission material having photosensitivity, exposing a region of the second layer located between the light shielding layers when viewed in plan view from a side of the second layer with a width narrower than the predetermined interval between the light shielding layers, developing the exposed first layer and the exposed second layer and forming a plurality of light transmission layers on the first main surface of the first light transmission substrate, press-fitting a second light transmission substrate facing the first light transmission substrate onto the plurality of light transmission layers, the second light transmission substrate including a second light transmission electrode on a main surface facing the main surface of the first light transmission substrate, and filling a light transmission dispersion medium including dispersed electrophoretic particles between the light transmission layers, the electrophoretic particles absorbing light and having a dispersion state changed by an applied voltage.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which:

FIG. 19 is a schematic view illustrating a height of a second light transmission region and the maximum emission angle according to Embodiment 5;

DETAILED DESCRIPTION

Hereinafter, a light beam direction control element and a display device according to embodiments are described with reference to the drawings.

Embodiment 1

Figure 1:
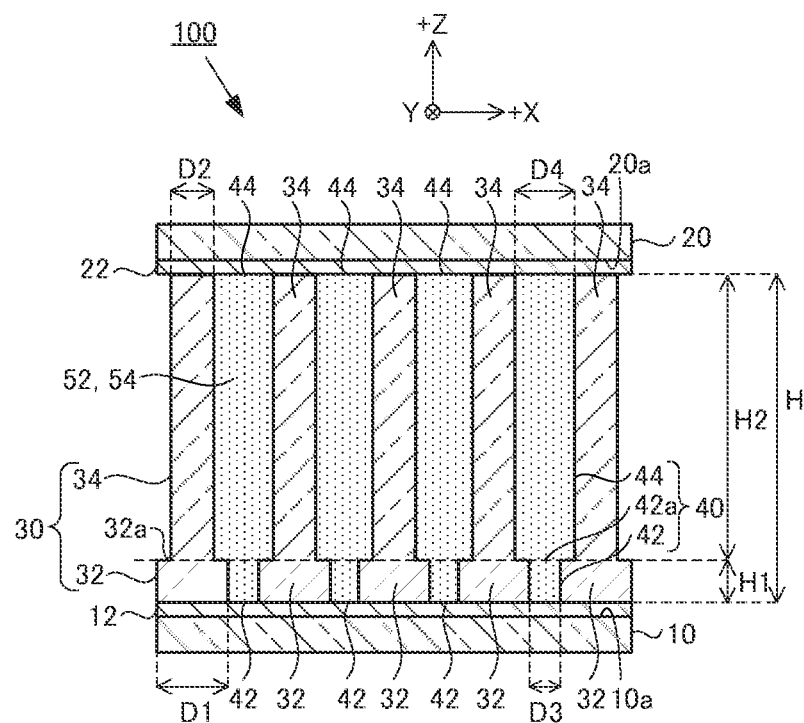
FIG. 1 is a cross-sectional view illustrating a light beam direction control element according to Embodiment 1.

A light beam direction control element 100 and a display device 300 according to the present embodiments are described with reference to FIGS. 1 to 13. As illustrated in FIG. 1, the light beam direction control element 100 includes a first light transmission substrate 10, a second light transmission substrate 20, light transmission regions 30, and light absorption regions 40. A light transmission dispersion medium 52 and electrophoretic particles 54 are enclosed in the light absorption region 40. Each of the light transmission regions 30 includes a first light transmission region 32 and a second light transmission region 34. Each of the light absorption regions 40 includes a first light absorption region 42 and a second light absorption region 44. In the light beam direction control element 100, a voltage applied to the electrophoretic particles 54 from an external power supply (not illustrated) changes a dispersion state of electrophoretic particles 54 in the light transmission dispersion medium 52, thereby changing an angular distribution of emitted light emitted from the light beam direction control element 100. In order to facilitate understanding, in this specification, the following description is given on the assumption that a right direction (right direction on the paper surface) of the light beam direction control element 100 in FIG. 1 is an +X direction, an upper direction (upper direction on the paper surface) thereof is a +Z direction, and a direction (depth direction on the paper surface) perpendicular to the +X direction and the +Z direction is a +Y direction. An X direction is also referred to as a horizontal direction, and a Z direction is also referred to as a vertical direction.

Figure 2:
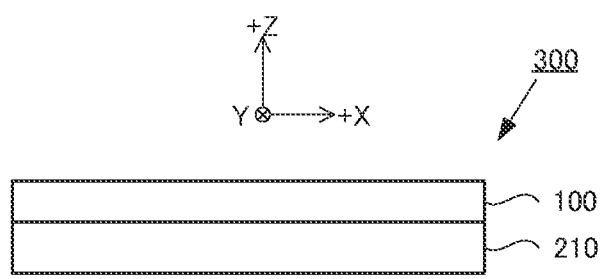
FIG. 2 is a schematic view illustrating a display device according to Embodiment 1.

As illustrated in FIG. 2, the light beam direction control element 100 constitutes the display device 300 together with a display panel 210. The display device 300 is mounted on a smart phone, a laptop computer, a vehicle, an information display, or the like. The display panel 210 displays characters, images, or the like. The display panel 210 is a liquid crystal display panel, an organic electro luminescence (EL) display panel, a micro light emitting diode (LED) display panel, or the like.

The light beam direction control element 100 controls an angular distribution of light (angular distribution of emitted light) emitted from the display panel 210 and passing through the light beam direction control element 100. The light beam direction control element 100 is disposed on a display surface of the display panel 210.

Referring now back to FIG. 1, the first light transmission substrate 10 of the light beam direction control element 100 transmits visible light. An example of the first light transmission substrate 10 includes a flat glass substrate. The first light transmission substrate 10 includes a first light transmission electrode 12 on a first main surface 10a thereof. In the present embodiment, the first light transmission electrode 12 is made of indium tin oxide (ITO) over the entire surface of the first main surface 10a. An insulating layer (not illustrated) is provided on the first light transmission electrode 12. The insulating layer is made of, for example, silicon oxide ($SiO_2$).

The second light transmission substrate 20 of the light beam direction control element 100 transmits visible light, like the first light transmission substrate 10. The second light transmission substrate 20 is, for example, a flat glass substrate. The second light transmission substrate 20 includes a second light transmission electrode 22 on a first main surface 20a thereof. The second light transmission electrode 22 is made of ITO over the entire surface of the first main surface 20a. An insulating layer is also provided on the second light transmission electrode 22.

The second light transmission substrate 20 faces the first light transmission substrate 10. In the present embodiment, the first main surface 10a of the first light transmission substrate 10 and the first main surface 20a of the second light transmission substrate 20 face each other.

The light transmission region 30 of the light beam direction control element 100 is a region that transmits visible light. The light transmission regions 30 are arranged in the X direction and interposed between the first light transmission substrate 10 and the second light transmission substrate 20. The light transmission region 30 is, for example, a light transmission layer made of light transmission resin. As illustrated in FIG. 1, Each of the light transmission regions 30 includes a first light transmission region 32 and a second light transmission region 34. In the present embodiment, the X direction corresponds to a predetermined direction.

Figure 3:
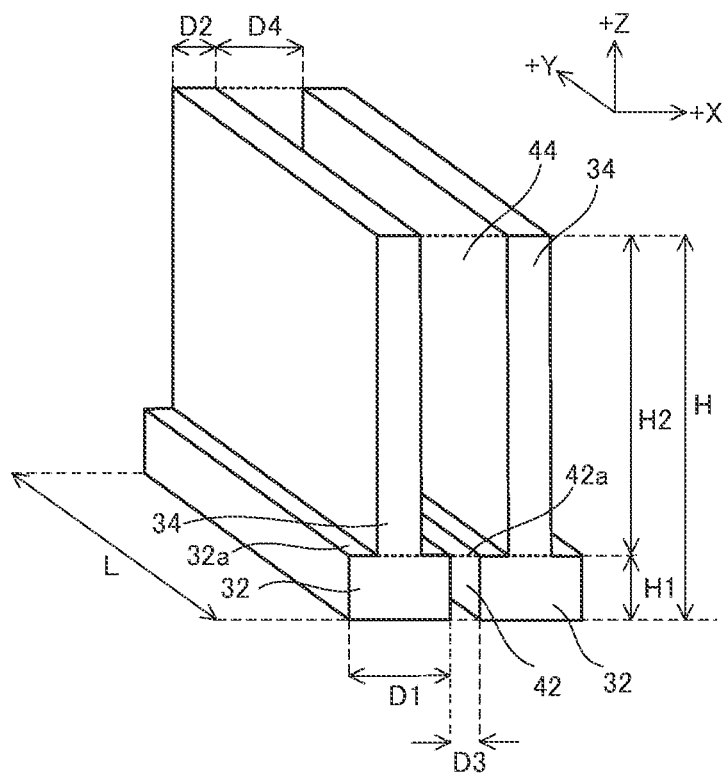
FIG. 3 is a perspective view illustrating a first light transmission region, a second light transmission region, a first light absorption region, and a second light absorption region according to Embodiment 1.

The first light transmission region 32 is provided on the first main surface 10a of the first light transmission substrate 10. As illustrated in FIGS. 1 and 3, the first light transmission region 32 has a rectangular parallelepiped shape extending perpendicularly to the first main surface 10a of the first light transmission substrate 10 (that is, extending in the +Z direction) from the first main surface 10a of the first light transmission substrate 10 toward the second light transmission substrate 20. The first light transmission regions 32 also extend in the Y direction (depth direction). The first light transmission regions 32 are arranged in the X direction at an interval corresponding to a width D3 of the first light absorption regions 42 to be described below. The interval between the first light transmission regions 32 refers to an interval between the side surfaces of adjacent first light transmission regions 32.

A height H1 of the first light transmission region 32 from the first main surface 10a of the first light transmission substrate 10 is lower than a height H2 of the second light transmission region 34 to be described below. When viewed in a cross section including an XZ cross section, that is, the X direction (predetermined direction) and perpendicular to the first main surface 10a of the first light transmission substrate 10 and the first main surface 20a of the second light transmission substrate 20, a width D1 of the first light transmission region 32 is wider than a width D2 of the second light transmission region 34 to be described below. A more specific configuration of the first light transmission region 32 is described below. The height H1 of the first light transmission region 32 from the first main surface 10a of the first light transmission substrate 10 is also referred to as the height H1 of the first light transmission region 32.

In the present embodiment, since the width D1 of the first light transmission region 32 is wide, the adhesion between the first light transmission substrate 10 and the first light transmission region 32 (light transmission layer) is improved. This prevents the light transmission region 30 (light transmission layer) from peeling off from the first light transmission substrate 10, thereby improving the durability of the light beam direction control element 100.

The second light transmission region 34 has a rectangular parallelepiped shape extending perpendicularly to the first main surface 10a of the first light transmission substrate 10 from an upper surface (surface on the +Z side) 32a of the first light transmission region 32 toward the second light transmission substrate 20. The second light transmission regions 34 also extend in the Y direction. The second light transmission regions 34 are arranged in the X direction at an interval corresponding to a width D4 of the second light absorption regions 44 to be described below. A height H2 of the second light transmission region 34 from the upper surface 32a of the first light transmission region 32 is higher than the height H1 of the first light transmission region 32. When viewed in XZ cross section, the width D2 of the second light transmission region 34 is narrower than the width D1 of the first light transmission region 32. A more specific configuration of the second light transmission region 34 is described below. The interval between the second light transmission regions 34 refers to an interval between the side surfaces of adjacent second light transmission regions 34. The height H2 of the second light transmission region 34 from the upper surface 32a of the first light transmission region 32 is also referred to as the height H2 of the second light transmission region 34.

As illustrated in FIGS. 1 and 3, the light absorption region 40 of the light beam direction control element 100 is a region between adjacent light transmission regions 30. Each of the light absorption regions 40 includes a first light absorption region 42 and a second light absorption region 44. The light absorption regions 40 are formed by forming the light transmission regions 30 on the first main surface 10a of the first light transmission substrate 10, as is described below. The first light absorption regions 42 are formed from adjacent first light transmission regions 32. The second light absorption regions 44 are formed from adjacent second light transmission regions 34.

The first light absorption region 42 is a region between adjacent first light transmission regions 32. Like the first light transmission region 32, the first light absorption region 42 extends perpendicularly to the first main surface 10a of the first light transmission substrate 10 from the first main surface 10a of the first light transmission substrate 10 toward the second light transmission substrate 20. The second light absorption region 44 is a region between adjacent second light transmission regions 34 and extends perpendicularly to the first main surface 10a of the first light transmission substrate 10 from the first light absorption region 42 toward the second light transmission substrate 20. The first light absorption region 42 and the second light absorption region 44 also extend in the Y direction.

In the present embodiment, since the first light absorption region 42 is a region between adjacent first light transmission regions 32, a height of the first light absorption region 42 from the first main surface 10a of the first light transmission substrate 10 is equal to the height H1 of the first light transmission region 32 from the first main surface 10a of the first light transmission substrate 10. Since the second light absorption region 44 is a region between adjacent second light transmission regions 34, the height of the second light absorption region 44 from an upper surface 42a of the first light absorption region 42 is equal to the height H2 of the second light transmission region 34 from the upper surface 32a of the first light transmission region 32. Moreover, since the height H1 of the first light transmission region 32 is lower than the height H2 of the second light transmission region 34, the height H1 of the first light absorption region 42 is lower than the height H2 of the second light absorption region 44. The height of the first light absorption region 42 from the first main surface 10a of the first light transmission substrate 10 is also referred to as the height H1 of the first light absorption region 42, and the height of the second light absorption region 44 from the upper surface 42a of the first light absorption region 42 is also referred to as the height H2 of the second light absorption region 44.

When viewed in XZ cross section, the width D1 of the first light transmission region 32 is wider than the width D2 of the second light transmission region 34. Therefore, when viewed in XZ cross section, the width D3 of the first light absorption region 42 is narrower than the width D4 of the second light absorption region 44. More specific configurations of the first light absorption region 42 and the second light absorption region 44 are described below.

The light transmission dispersion medium 52 of the light beam direction control element 100 is enclosed in the light absorption region 40. The light transmission dispersion medium 52 transmits visible light. The light transmission dispersion medium 52 disperses the electrophoretic particles 54.

The electrophoretic particles 54 of the light beam direction control element 100 are dispersed in the light transmission dispersion medium 52. The electrophoretic particles 54 absorb visible light. The electrophoretic particles 54 are positively or negatively charged, and a dispersion state of the electrophoretic particles 54 in the light transmission dispersion medium 52 is changed by a voltage applied by the first light transmission electrode 12 and the second light transmission electrode 22. The electrophoretic particles 54 are, for example, charged carbon black particles. In the present embodiment, the electrophoretic particles 54 are assumed to be negatively charged.

The light transmission dispersion medium 52 and the electrophoretic particles 54 dispersed in the light transmission dispersion medium 52 are enclosed in the light absorption region 40. Therefore, the light absorption region 40 (the first light absorption region 42 and the second light absorption region 44) serves as an electrophoretic element together with the first light transmission electrode 12 and the second light transmission electrode 22. By controlling a potential V1 of the first light transmission electrode 12 and a potential V2 of the second light transmission electrode 22, the dispersion state of the electrophoretic particles 54 is changed, thereby allowing the light absorption region 40 to serve as a light absorption layer depending on the dispersion state of the electrophoretic particles 54.

An operation of the light beam direction control element 100 is described below on the assumption that a surface light source (uniform diffusion surface light source) 700 whose luminance is constant when viewed from any direction is disposed on the side of the first light transmission substrate 10 of the light beam direction control element 100. The light beam direction control element 100 controls an angular distribution of light 710 incident from the −Z direction and emits light in the +Z direction.

Narrow Field-of-View Mode

When the potential V1 of the first light transmission electrode 12 and the potential V2 of the second light transmission electrode 22 are equal to each other and no voltage is applied to the electrophoretic particles 54, the electrophoretic particles 54 are uniformly dispersed over the entire light absorption region 40. In this case, the entire light absorption region 40 (the first light absorption region 42 and the second light absorption region 44) serves as a light absorption layer. Hereinafter, the above state is referred to as a narrow-field-of-view mode.

Figure 4:
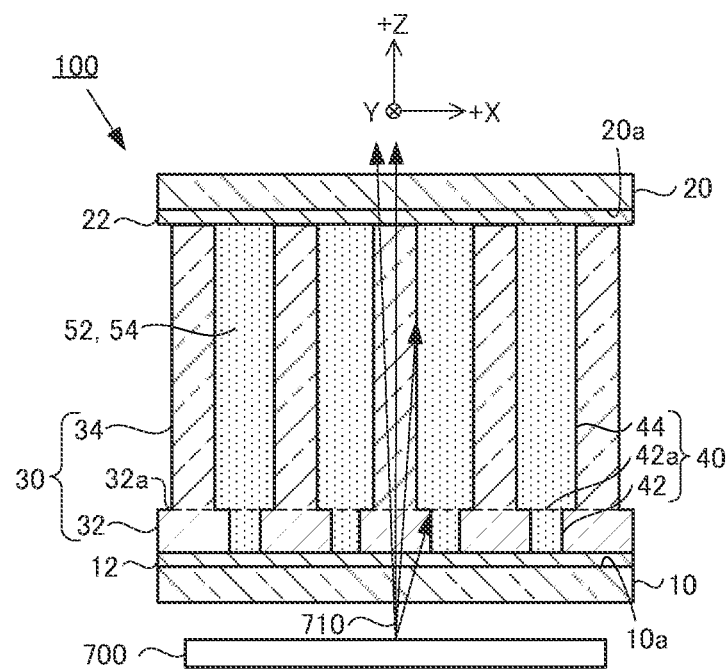
FIG. 4 is a schematic view illustrating a narrow field-of-view mode according to Embodiment 1.
Figure 5:
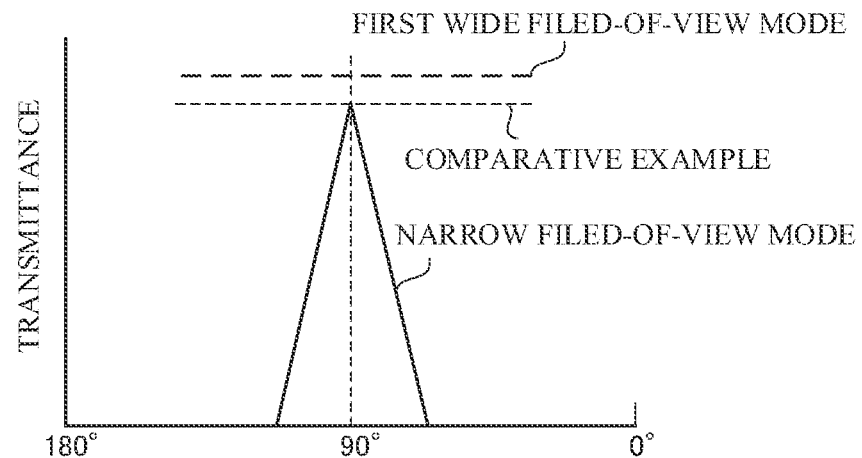
FIG. 5 is a view illustrating an angular distribution of emitted light in the light beam direction control element on a plane parallel to an XZ plane according to Embodiment 1.

When viewed cross-sectionally on an XZ plane, since the first light absorption region 42 and the second light absorption region 44 are perpendicular to the first main surface 10a of the first light transmission substrate 10, light, other than light near the +Z direction, of the light 710 incident from the surface light source 700 is absorbed in the first light absorption region 42 and the second light absorption region 44 in the narrow field-of-view mode as illustrated in FIG. 4. In the XZ plane, of the light 710 incident from the surface light source 700, the light near the +Z direction is emitted from the light beam direction control element 100. Therefore, when the +X direction is 0°, the +Z direction is 90°, and the —X direction is 180°, on a plane parallel to the XZ plane, light emitted from the light beam direction control element 100 in the narrow field-of-view mode has a narrow angular distribution near 90° (+Z direction) as illustrated in FIG. 5.

In a plane parallel to a YZ plane including the first light transmission region 32 and the second light transmission region 34, since the first light transmission region 32 and the second light transmission region 34 extend in the Y direction, light emitted from the light beam direction control element 100 in the narrow field-of-view mode has a uniform angular distribution. In another plane parallel to the YZ plane, since the first light absorption region 42 and the second light absorption region 44 extend in the Y direction, the light 710 incident from the surface light source 700 is absorbed in the first light absorption region 42 and the second light absorption region 44. The plane parallel to the YZ plane includes the YZ plane.

As described above, light emitted from the light beam direction control element 100 in the narrow field-of-view mode has a narrow angular distribution near 90° (+Z direction) in the plane parallel to the XZ plane, and has a uniform angular distribution in the plane parallel to the YZ plane including the first light transmission region 32 and the second light transmission region 34. Consequently, in the narrow field-of-view mode, the light beam direction control element 100 can limit the viewing angle of the display device 300 in the left-right direction (X direction) to near the front (+Z direction).

First Wide Field-of-View Mode

When the potential V1 of the first light transmission electrode 12 is made higher than the potential V2 of the second light transmission electrode 22 and a predetermined first voltage is applied to the electrophoretic particles 54, the electrophoretic particles 54 negatively charged are collected in the first light absorption regions 42 and only the first light absorption regions 42 serves as a light absorption layer. Hereinafter, the above state is referred to as a first wide field-of-view mode.

Figure 6:
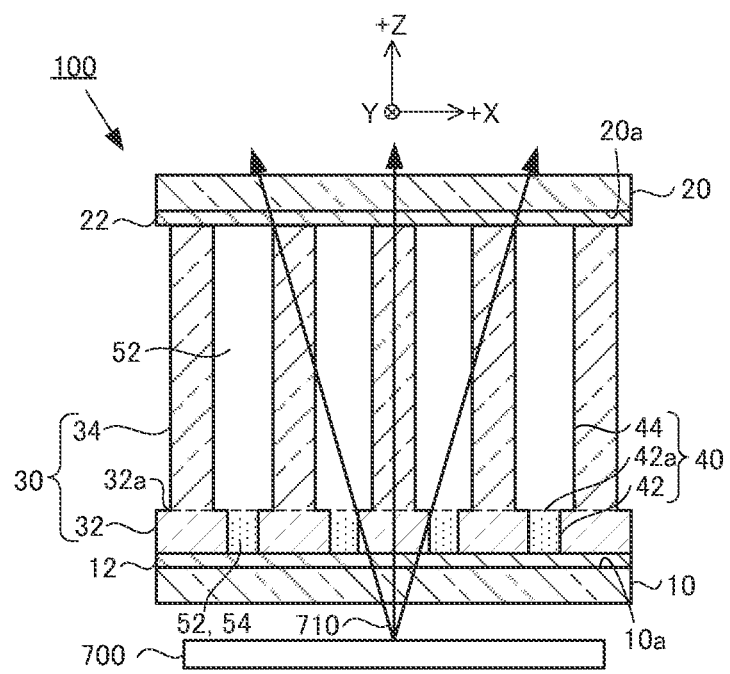
FIG. 6 is a schematic view illustrating a first wide field-of-view mode according to Embodiment 1.

In the first wide field-of-view mode, only the first light absorption region 42 serves as a light absorption layer. The height H1 of the first light absorption region 42 from the first main surface 10a of the first light transmission substrate 10 is lower than the height H2 of the second light absorption region 44 from the upper surface 42a of the first light absorption region 42. Therefore, when viewed cross-sectionally on the XZ plane, as illustrated in FIG. 6, of the light 710 incident from the surface light source 700, only a part of incident light having a large angle with respect to the +Z direction is absorbed in the first light absorption region 42, and the other incident light is emitted from the light beam direction control element 100. That is, in the plane parallel to the XZ plane, light emitted from the light beam direction control element 100 in the first wide field-of-view mode has a wide angular distribution as illustrated in FIG. 5.

In the plane parallel to the YZ plane including the first light transmission region 32 and the second light transmission region 34, since the first light transmission region 32 and the second light transmission region 34 extend in the Y direction, light emitted from the light beam direction control element 100 in the first wide field-of-view mode has a uniform angular distribution. In another plane parallel to the YZ plane, since the first light absorption regions 42 extend in the Y direction, the light 710 incident from the surface light source 700 is absorbed in the first light absorption regions 42.

As described above, light emitted from the light beam direction control element 100 in the first wide field-of-view mode has a wide angular distribution in the plane parallel to the XZ plane, and has a uniform angular distribution in the plane parallel to the YZ plane including the first light transmission region 32 and the second light transmission region 34. Therefore, in the first wide field-of-view mode, the light beam direction control element 100 hardly limits the viewing angle of the display device 300. The first wide field-of-view mode refers to a state in which an angular distribution of emitted light is wide.

More specific configurations of the first light transmission region 32, the second light transmission region 34, the first light absorption region 42, and the second light absorption region 44 are described. As an example, the light transmission region 30 is formed so that the height H1 of the first light transmission region 32 is 25 μm, the width D1 of the first light transmission region 32 is 45 μm, the height H2 of the second light transmission region 34 of 120 μm, and the width D2 of the second light transmission region 34 is 40 μm. The light absorption region 40 is formed so that the height H1 of the first light absorption region 42 is 25 μm, the width D3 of the first light absorption region 42 (interval between the first light transmission regions 32) is 5 μm, and the width D4 of the second light absorption region 44 (interval between the second light transmission regions 34) is 10 μm. The height H of the light transmission region 30 and the light absorption region 40 from the first main surface 10a of the first light transmission substrate 10 is 145 µm.

The above light absorption region 40 is filled with, for example, the light transmission dispersion medium 52 including 4 wt % of the electrophoretic particles 54 with an average particle size of 120 nm. Specifically, when the particle density of the electrophoretic particles 54 is 0.5 g/cm$^3$, the maximum filling factor of the electrophoretic particles 54 in the light absorption region 40 is 71.6% (74% in the most dense filling), the solvent density of the liquid of the light transmission dispersion medium 52 is 0.75 g/cm$^3$, and the length (depth) in the Y direction of the light transmission region 30 and the light absorption region 40 is L the first light absorption region 42 can be filled with the electrophoretic particles 54 up to 21.8 µm of the height H1 (25 µm) thereof as expressed by equation (1) below.

$$L \times (120 \times 10 + 25 \times 5) \times \frac{\frac{0.04}{0.5}}{\frac{0.04}{0.5} + \frac{0.96}{0.75}} \times \frac{1}{0.716} \times \frac{1}{L \times 5} = 21.8 \quad (1)$$

Figure 7:
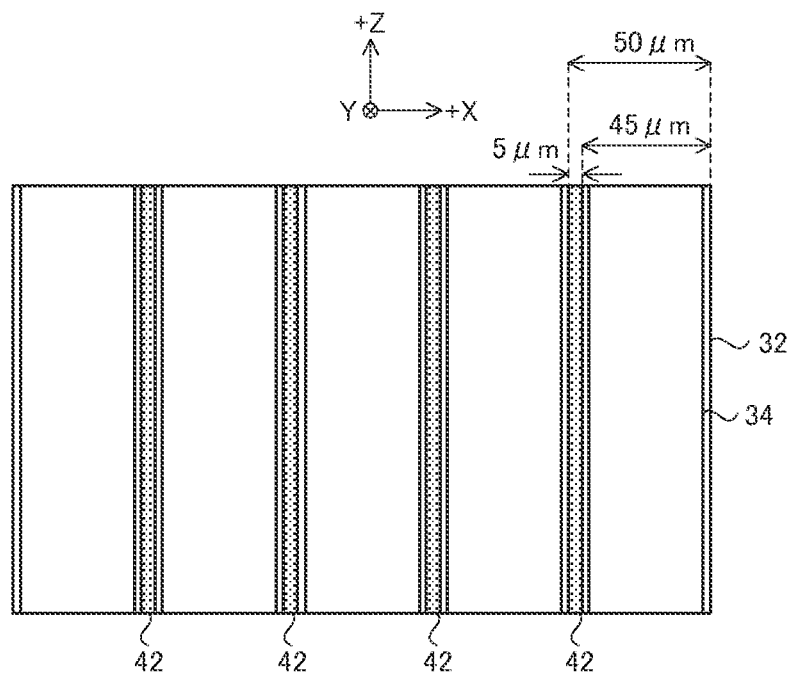
FIG. 7 is a plan view illustrating the light beam direction control element in the first wide field-of-view mode according to Embodiment 1.

When the light beam direction control element 100 in the first wide field-of-view mode, which has the above configuration, is viewed in plan view from the +Z direction as illustrated in FIG. 7, the aperture ratio of the light beam direction control element 100 in the first wide field-of-view mode is 90% ((45/50)×100). On the other hand, when the light absorption region 40 is formed only by the second light absorption region 44 (hereinafter, referred to as a comparative example), the aperture ratio of a light beam direction control element in a wide field-of-view mode is 80% ((40/50)×100). FIG. 7 does not illustrate the first light transmission substrate 10, the second light transmission substrate 20, and the like in order to facilitate understanding.

In the present embodiment, the height H1 of the first light transmission region 32 forming the first light absorption region 42 where the electrophoretic particles 54 are collected in the first wide field-of-view mode is lower than the height H2 of the second light transmission region 34 and the aspect ratio of the first light transmission regions 32 is small, so that the interval between the first light transmission regions 32 (that is, the width D3 of the first light absorption regions 42) can be easily narrowed. Since the width D1 of the first light transmission region 32 is wider than the width D2 of the second light transmission region 34, the width D3 of the first light absorption region 42 where the electrophoretic particles 54 are collected in the first wide field-of-view mode is narrower than the width D4 of the second light absorption region 44, so that the aperture ratio of the light beam direction control element 100 in the first wide field-of-view mode can be increased as in the above example. Since the aperture ratio in the first wide field-of-view mode is high, the transmittance of the light beam direction control element 100 in the first wide field-of-view mode can be increased as illustrated in FIG. 5.

Figure 8:
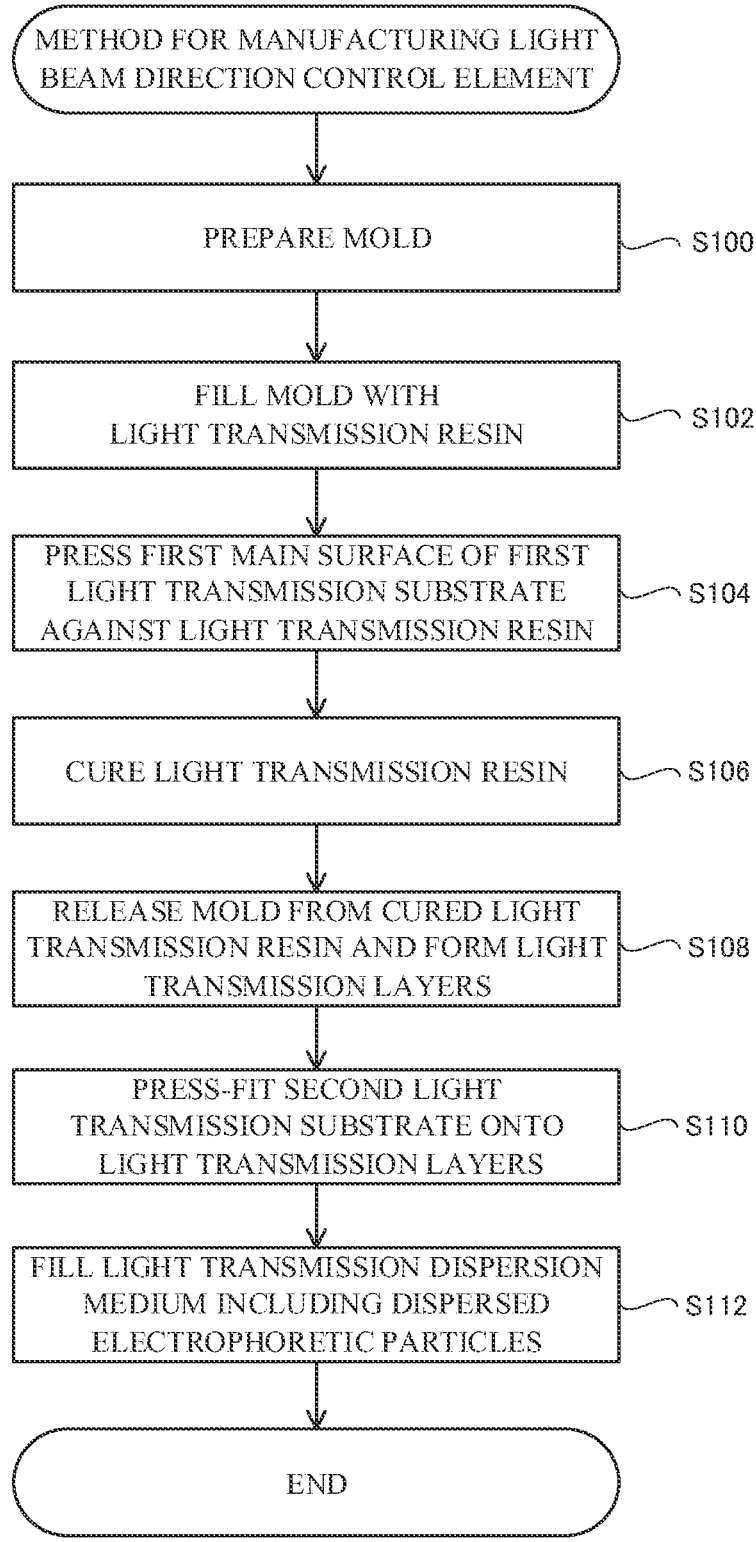
FIG. 8 is a flowchart illustrating a method for manufacturing the light beam direction control element according to Embodiment 1.

Next, a method for manufacturing the light beam direction control element 100 is described. FIG. 8 is a flowchart illustrating the method for manufacturing the light beam direction control element 100. The method for manufacturing the light beam direction control element 100 includes a step of preparing a mold 400 (step S100), a step of filling the mold 400 with light transmission resin 450 (step S102), a step of pressing the first main surface 10a of the first light transmission substrate 10 against the light transmission resin 450 exposed from between second pillars 424 (step S104), a step of curing the light transmission resin 450 (step S106), and a step of releasing the mold 400 from the cured light transmission resin 450 and forming a plurality of light transmission layers 60 on the first main surface 10a of the first light transmission substrate 10 (step S108).

The method for manufacturing the light beam direction control element 100 further includes a step of press-fitting the second light transmission substrate 20 onto the plurality of light transmission layers 60 (step S110) and a step of filling the light transmission dispersion medium 52, in which the electrophoretic particles 54 are dispersed, between the light transmission layers 60 (step S112).

Figure 9:
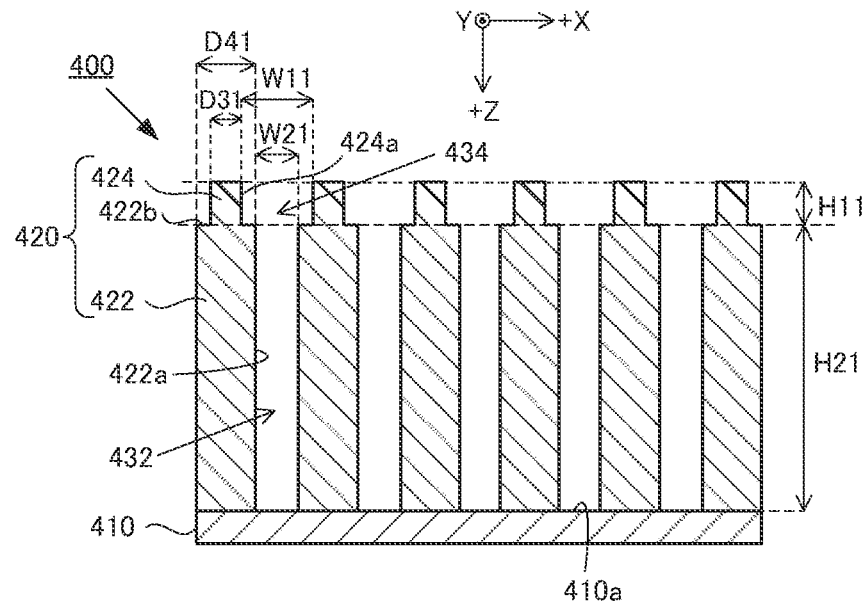
FIG. 9 is a schematic view illustrating a mold according to Embodiment 1.

At step S100, a known photolithographic technique is used to prepare the mold 400 for forming the light transmission region 30 on the first main surface 10a of the first light transmission substrate 10. The mold 400 includes a mold substrate 410 and pillars 420 as illustrated in FIG. 9. The mold substrate 410 is, for example, a silicon substrate. The pillars 420 are made of chemically amplified photoresist: SU-8 (trade name, Nippon Kayaku Co., Ltd.) on a first main surface 410a of the mold substrate 410 by using the known photolithographic technique. The shape of the pillar 420 corresponds to the light absorption region 40 of the light beam direction control element 100. The shape of a space between adjacent pillars 420 corresponds to the shape of the light transmission region 30 of the light beam direction control element 100.

Each of the pillars 420 includes a first pillar 422 and a second pillar 424. The first pillar 422 is provided on the first main surface 410a of the mold substrate 410 perpendicularly to the first main surface 410a, and has a rectangular parallelepiped shape. The first pillars 422 are arranged in the X direction so that an interval W21 between side surfaces 422a (surface on the +X side and surface on the −X side) of adjacent first pillars 422 is equal to the width D2 of the second light transmission region 34 of the light beam direction control element 100, and extend in the Z direction and the Y direction. A height H21 of the first pillar 422 from the first main surface 410a of the mold substrate 410 is equal to the height H2 of the second light absorption region 44 and the second light transmission region 34. When viewed in XZ cross section, a width D41 of the first pillar 422 is equal to the width D4 of the second light absorption region 44. The shape of the first pillar 422 corresponds to the shape of the second light absorption region 44 of the light beam direction control element 100. The shape of a space 432 between adjacent first pillars 422 corresponds to the shape of the second light transmission region 34 of the light beam direction control element 100.

The second pillar 424 is provided on an upper surface (surface on the +Z side) 422b of the first pillar 422 perpendicularly to the first main surface 410a, and has a rectangular parallelepiped shape. The second pillars 424 are arranged in the X direction so that an interval W11 between side surfaces 424a of adjacent second pillars 424 is equal to the width D1 of the first light transmission region 32 of the light beam direction control element 100, and extend in the Z direction and the Y direction. A height H11 of the second pillar 424 from the upper surface 422b of the first pillar 422 is equal to the height H1 of the first light absorption region 42 and the first light transmission region 32. When viewed in XZ cross section, a width D31 of the second pillar 424 is equal to the width D3 of the first light absorption region 42. The shape of the second pillar 424 corresponds to the shape of the first light absorption region 42 of the light beam direction control element 100. The shape of a space 434 between adjacent second pillars 424 corresponds to the shape of the first light transmission region 32 of the light beam direction control element 100.

In the present embodiment, the height H21 of the first pillar 422 is equal to the height H2 of the second light absorption region 44 and the second light transmission region 34, and the height H11 of the second pillar 424 is equal to the height H1 of the first light absorption region 42 and the first light transmission region 32. Since the height H1 of the first light absorption region 42 and the first light transmission region 32 is lower than the height H2 of the second light absorption region 44 and the second light transmission region 34, the height H11 of the second pillar 424 (that is, the height of the space 434 between the adjacent second pillars 424) is lower than the height H21 of the first pillars 422 (that is, the height of the space 432 between the adjacent first pillars 422).

The interval W21 between the first pillars 422 is equal to the width D2 of the second light transmission region 34, and the interval W11 between the second pillars 424 is equal to the width D1 of the first light transmission region 32. Since the width D1 of the first light transmission region 32 is wider than the width D2 of the second light transmission region 34, the interval W11 between the second pillars 424 (that is, the width of the space 434 between the adjacent second pillars 424) is wider than the interval W21 between the first pillars 422 (that is, the width of the space 432 between the adjacent first pillars 422).

Figure 10:
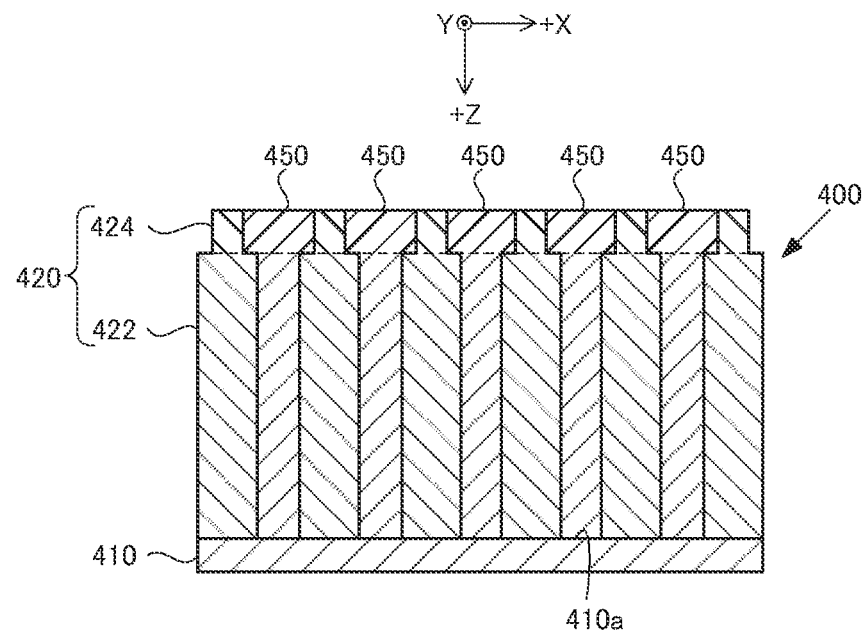
FIG. 10 is a schematic view illustrating the mold and light transmission resin according to Embodiment 1.

At step S102, as illustrated in FIG. 10, a gap between the pillars 420 of the mold 400 is filled with the light transmission resin 450. The filled light transmission resin 450 is defoamed. The light transmission resin 450 is, for example, thermosetting silicone resin.

Figure 11:
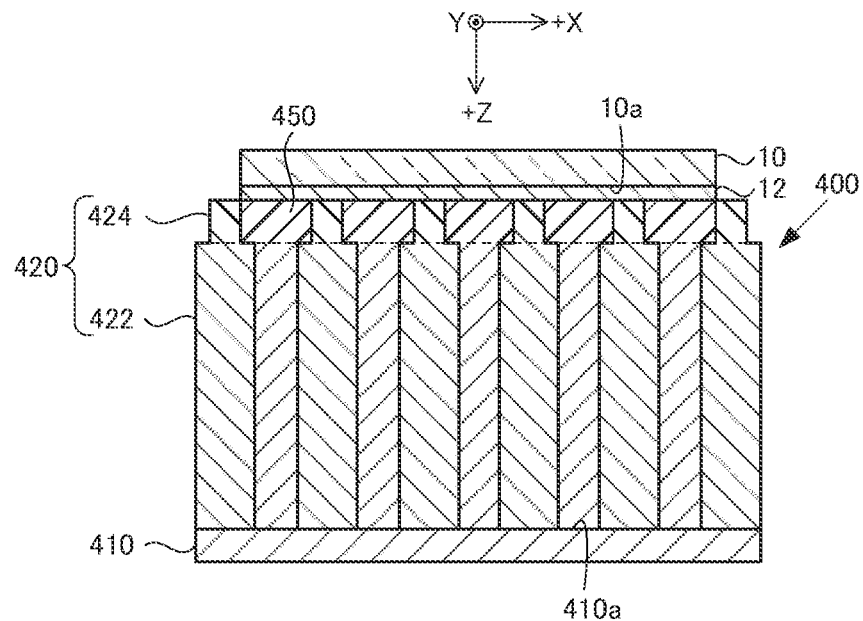
FIG. 11 is a schematic view illustrating the mold, the light transmission resin, and a first light transmission substrate according to Embodiment 1.

At step S104, as illustrated in FIG. 11, the first main surface 10*a* of the first light transmission substrate 10 is pressed against the second pillars 424 and the light transmission resin 450 exposed from between the second pillars 424.

At step S106, the light transmission resin 450 pressed against the first main surface 10*a* of the first light transmission substrate 10 is heated and cured.

Figure 12:
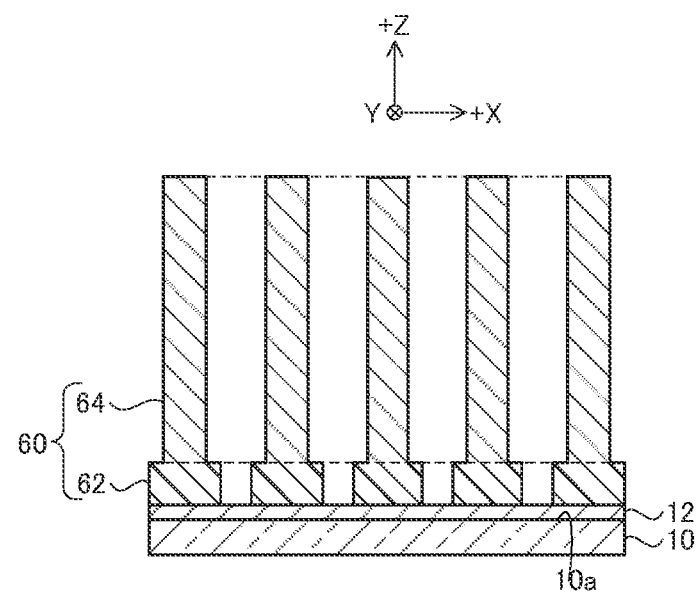
FIG. 12 is a schematic view illustrating the first light transmission substrate and a light transmission layer according to Embodiment 1.

At step S108, as illustrated in FIG. 12, the mold 400 is released from the cured light transmission resin 450 to form the light transmission layers 60 on the first main surface 10*a* of the first light transmission substrate 10. Each of the light transmission layers 60 includes a first light transmission layer 62 having a shape corresponding to the space 434 between the adjacent second pillars 424, and a second light transmission layer 64 having a shape corresponding to the shape of the space 432 between the adjacent first pillars 422. Since the shape of the space 434 between the adjacent second pillars 424 corresponds to the shape of the first light transmission region 32 of the light beam direction control element 100 and the space 432 between the adjacent first pillars 422 corresponds to the shape of the second light transmission region 34 of the light beam direction control element 100, the light transmission layers 60 corresponding to the light transmission regions 30 of the light beam direction control element 100 are formed on the first main surface 10*a* of the first light transmission substrate 10 at this step.

Figure 13:
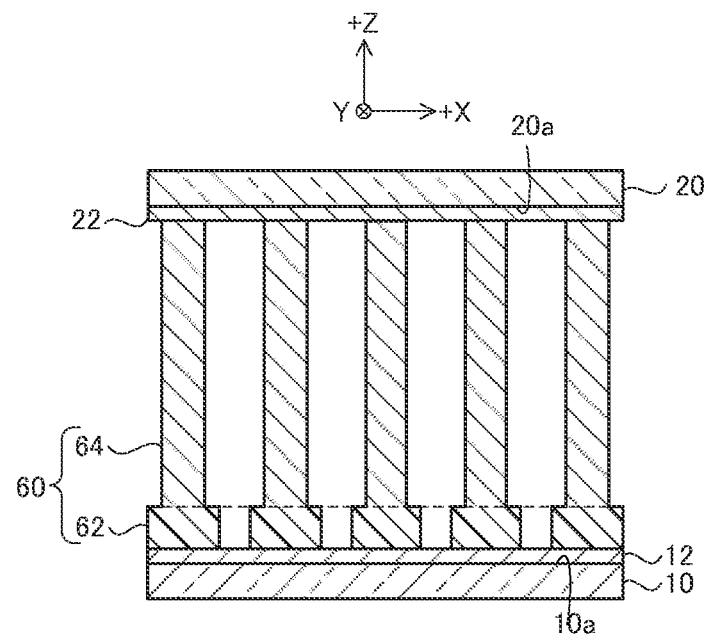
FIG. 13 is a schematic view illustrating the first light transmission substrate, the light transmission layer, and a second light transmission substrate according to Embodiment 1.

At step S110, as illustrated in FIG. 13, the first main surface 20*a* of the second light transmission substrate 20 is opposed to the first main surface 10*a* of the first light transmission substrate 10, and the second light transmission substrate 20 is press-fitted onto the light transmission layers 60.

At step S112, a gap between the light transmission layers 60 is filled with the light transmission dispersion medium 52 in which the electrophoretic particles 54 are dispersed. Thus, the light absorption regions 40 (the first light absorption regions 42 and the second light absorption regions 44) are formed. The light absorption region 40 is sealed with an adhesive.

As described above, the light beam direction control element 100 can be manufactured. In the present embodiment, portions (first light transmission layers 62) corresponding to the first light transmission regions 32 arranged at narrow intervals (width D3 of the first light absorption region 42) are formed from the second pillars 424 of the mold 400 formed at the wide intervals W11. Therefore, the light beam direction control element 100 can be easily manufactured.

As described above, the height H1 of the first light transmission region 32 forming the first light absorption region 42 is lower than the height H2 of the second light transmission region 34, and the width D1 of the first light transmission region 32 is wider than the width D2 of the second light transmission region 34. Consequently, by narrowing the width D3 of the first light absorption region 42 where the electrophoretic particles 54 are collected in the first wide field-of-view mode (state in which an angular distribution of emitted light is wide), the aperture ratio of the light beam direction control element 100 in the first wide field-of-view mode can be increased, and the transmittance of the light beam direction control element 100 in the first wide field-of-view mode can be increased. Furthermore, since the width D1 of the first light transmission region 32 is wide, the adhesion between the first light transmission substrate 10 and the first light transmission region 32 (light transmission layer) is improved, so that the durability of the light beam direction control element 100 can be improved.

Embodiment 2

In the first wide field-of-view mode of Embodiment 1, only the first light absorption region 42 serves as a light absorption layer. In a state where the angular distribution of emitted light in the light beam direction control element 100 is wide, the first light absorption region 42 and a part of the second light absorption region 44 may serve as a light absorption layer. Hereinafter, a state in which the first light absorption region 42 and a part of the second light absorption region 44 serves as a light absorption layer is referred to as a second wide field-of-view mode. The other configurations of the present embodiment are the same as those of Embodiment 1, except for a region serving as a light absorption layer.

Figure 14:
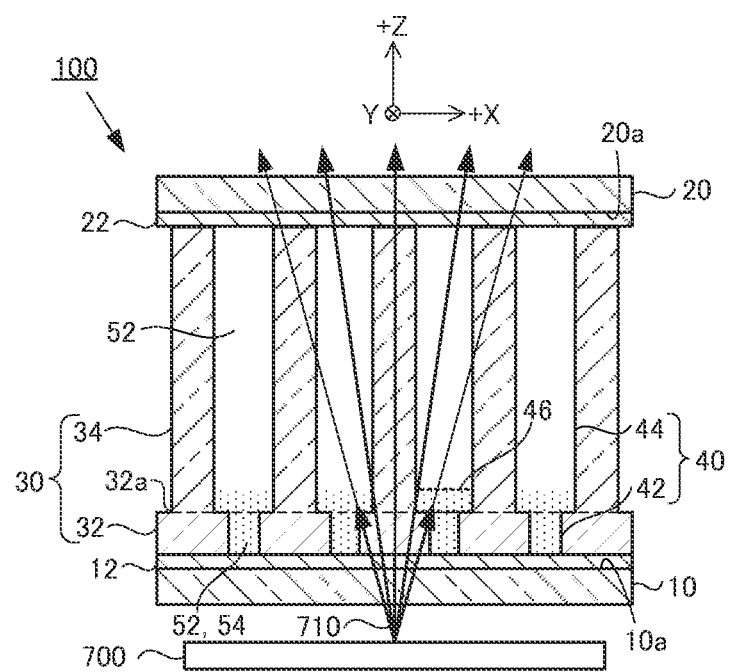
FIG. 14 is a schematic view illustrating a second wide field-of-view mode according to Embodiment 2.

In the second wide field-of-view mode, a predetermined second voltage lower than the predetermined first voltage in the first wide field-of-view mode is applied to the electrophoretic particles 54. Thus, as illustrated in FIG. 14, the electrophoretic particles 54 are collected on the first light transmission substrate 10 side, and the first light absorption regions 42 and a region 46 of the second light absorption regions 44 on the first light absorption region 42 side serve as light absorption layers.

Figure 15:
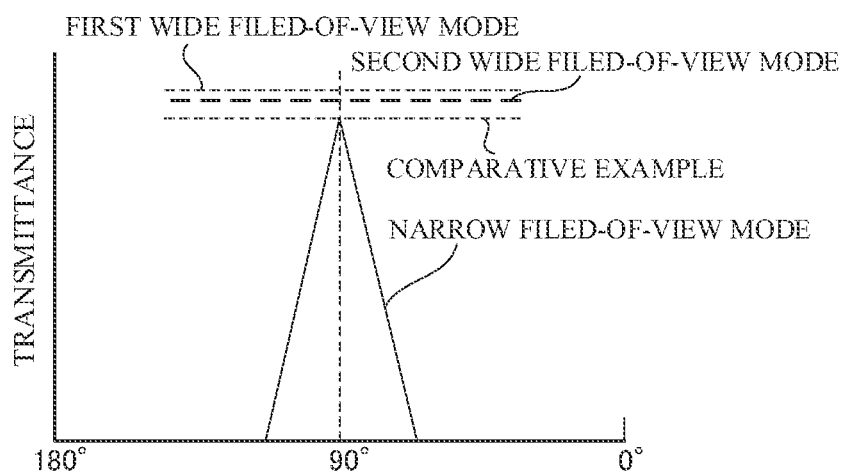
FIG. 15 is a view illustrating an angular distribution of emitted light in the light beam direction control element on a plane parallel to an XZ plane according to Embodiment 2.

In the second wide field-of-view mode, since the electrophoretic particles 54 are also collected in the first light absorption region 42 located on the first light transmission substrate 10 side, the optical density (OD) value of the region 46 of the second light absorption region 44 is low. Thus, a part of the light 710 incident on the region 46 of the second light absorption region 44 is transmitted through the region 46 of the second light absorption region 44 and emitted from the light beam direction control element 100. Therefore, in the second wide field-of-view mode, the light beam direction control element 100 hardly limits the viewing angle of the display device 300 as in the first wide field-of-view mode. Since a part of the light 710 incident on the region 46 of the second light absorption region 44 is also emitted from the light beam direction control element 100, the transmittance of the light beam direction control element 100 in the second wide field-of-view mode is higher than the transmittance of the comparative example in which the light absorption region 40 is formed only by the second light absorption region 44, as illustrated in FIG. 15.

As described above, by applying the predetermined second voltage lower than the predetermined first voltage to the electrophoretic particles 54, the electrophoretic particles 54 are collected on the first light transmission substrate 10 side, which makes it possible to increase the transmittance of the light beam direction control element 100 also in the second wide field-of-view mode (state in which the angular distribution of emitted light is wide) in which the first light absorption region 42 and a part (region 46) of the second light absorption region 44 serve as light absorption layers.

Embodiment 3

In Embodiment 1 and Embodiment 2, the second light transmission region 34 of the light beam direction control element 100 has a rectangular parallelepiped shape, and when viewed cross-sectionally on the XZ plane, the second light transmission region 34 has a rectangular shape. When cross-sectionally viewed on the XZ plane, the second light transmission region 34 may have another shape.

Figure 16:
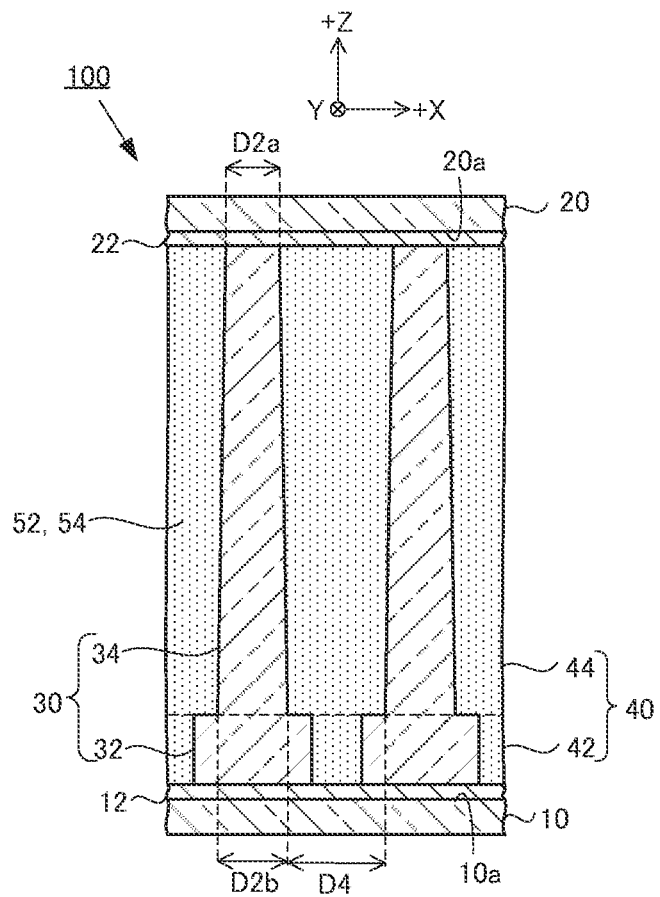
FIG. 16 is a cross-sectional view illustrating the light beam direction control element according to Embodiment 3.

For example, as illustrated in FIG. 16, the second light transmission region 34 may have a trapezoidal shape (tapered shape) when viewed cross-sectionally on the XZ plane. In the present embodiment, the second light transmission region 34 has a trapezoidal shape in which a width D2b on the −Z side is wider than a width D2a on the +Z side. For example, the width D2b is 40 μm and the width D2a is 30 μm to 36 μm. The other dimensions of the light transmission region 30 are the same as in the example of Embodiment 1.

In the present embodiment, since the width D2b on the −Z side of the second light transmission region 34 is wider than the width D2a on the +Z side of the second light transmission region 34, the width of the second light absorption region 44 is reduced toward the first light absorption region 42. Thus, the electrophoretic particles 54 can be easily collected in the first light absorption region 42 located on the −Z side.

Embodiment 4

In Embodiment 1 and Embodiment 2, the first light transmission region 32 of the light beam direction control element 100 has a rectangular parallelepiped shape, and when viewed cross-sectionally on the XZ plane, the first light transmission region 32 has a rectangular shape. When cross-sectionally viewed on the XZ plane, the first light transmission region 32 may have another shape.

Figure 17:
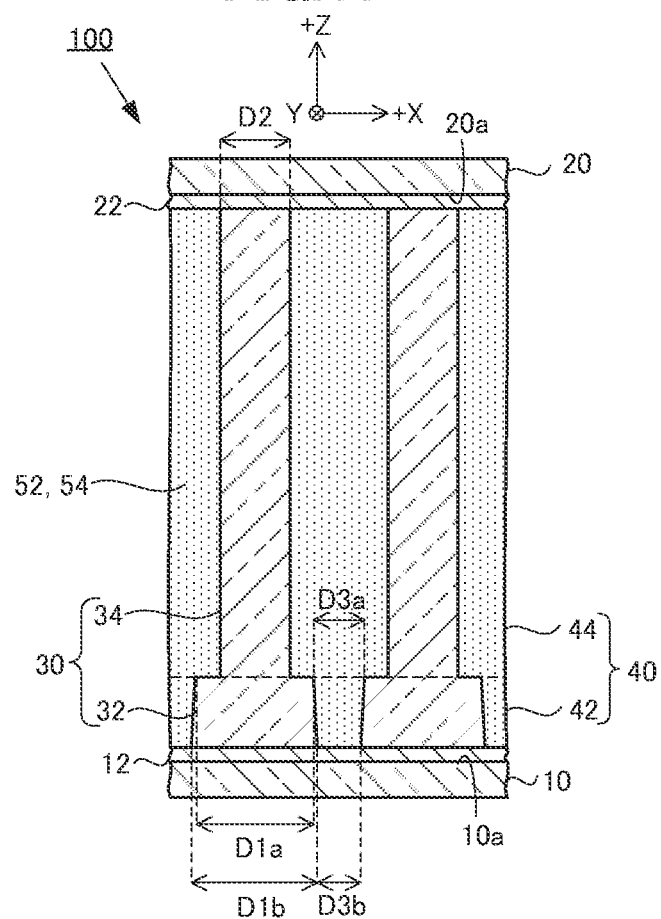
FIG. 17 is a cross-sectional view illustrating the light beam direction control element according to Embodiment 4.

For example, as illustrated in FIG. 17, the first light transmission region 32 may have a trapezoidal shape (tapered shape) when viewed cross-sectionally on the XZ plane. In the present embodiment, the first light transmission region 32 has a trapezoidal shape in which a width D1b on the −Z side is wider than a width D1a on the +Z side. For example, the width D1a is 45 μm and the width D1b is 47 μm. For example, a width D3a on the +Z side of the first light absorption region 42 is 5 μm, and a width D3b on the −Z side of the first light absorption region 42 is 3 μm. The other dimensions of the light transmission region 30 are the same as in the example of Embodiment 1.

In the present embodiment, since the width D1b on the −Z side of the first light transmission region 32 is wider than the width D1a on the +Z side of the first light transmission region 32, the electrophoretic particles 54 can be easily collected in the first light absorption region 42.

Embodiment 5

In one example of Embodiment 1, the ratio of the height H1 (25 μm) of the first light transmission region 32 to the height H2 (120 μm) of the second light transmission region 34 is 1:4.8. In the light beam direction control elements 100 of Embodiment 1 to Embodiment 4, the ratio of the height H1 of the first light transmission region 32 to the height H2 of the second light transmission region 34 is preferably 1:2.6 or more.

Figure 18:
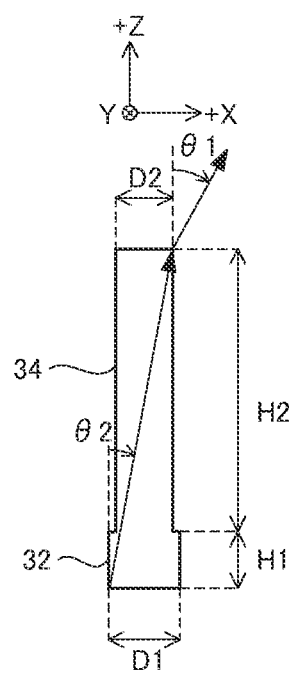
FIG. 18 is a schematic view illustrating a maximum emission angle according to Embodiment 5.

For example, when the light beam direction control element 100 of Embodiment 1 is viewed in XZ cross section, a maximum emission angle θ1 of light emitted from the light beam direction control element 100 with respect to the +Z direction is represented by FIG. 18 and equation 2 below when the refraction of light in the first light transmission substrate 10 and the second light transmission substrate 20 is ignored. In equation 2 below, n represents a refractive index of the light transmission region 30, and θ2 represents an angle of light incident on the light beam direction control element 100 with respect to the +Z direction.

$$\theta 1 = \sin^{-1}\left(n \times \sin\left(\tan^{-1}\left(\frac{D1 + D2}{2 \times (H1 + H2)}\right)\right)\right) \quad (2)$$

FIG. 19 illustrates the relationship between the height H2 of the second light transmission region 34 and the maximum emission angle θ1 calculated from equation 2 above when the height H1 of the first light transmission region 32 is 25 μm, the width D1 of the first light transmission region 32 is 45 μm, and the width D2 of the second light transmission region 34 is 40 μm (similarly to one example of Embodiment 1). As illustrated in FIG. 19, when the refractive index n of the light transmission region 30 is 1.5 and the height H2 of the second light transmission region 34 is equal to or greater than 65 μm (that is, the ratio of the height H1 of the first light transmission region 32 to the height H2 of the second light transmission region 34 is set to 1:2.6), the maximum emission angle θ1 can be set to be equal to or less than 40°. Consequently, when the refractive index n of the light transmission region 30 is 1.5 and the ratio of the height H1 of the first light transmission region 32 to the height H2 of the second light transmission region 34 is equal to or less than 1:2.6, the viewing angle of the display device 300 in the horizontal direction can be equal to or less than 80°.

Embodiment 6

In Embodiment 1, the light beam direction control element 100 is manufactured using a mold. The light beam direction control element 100 may be manufactured using a photolithographic technique.

Figure 20:
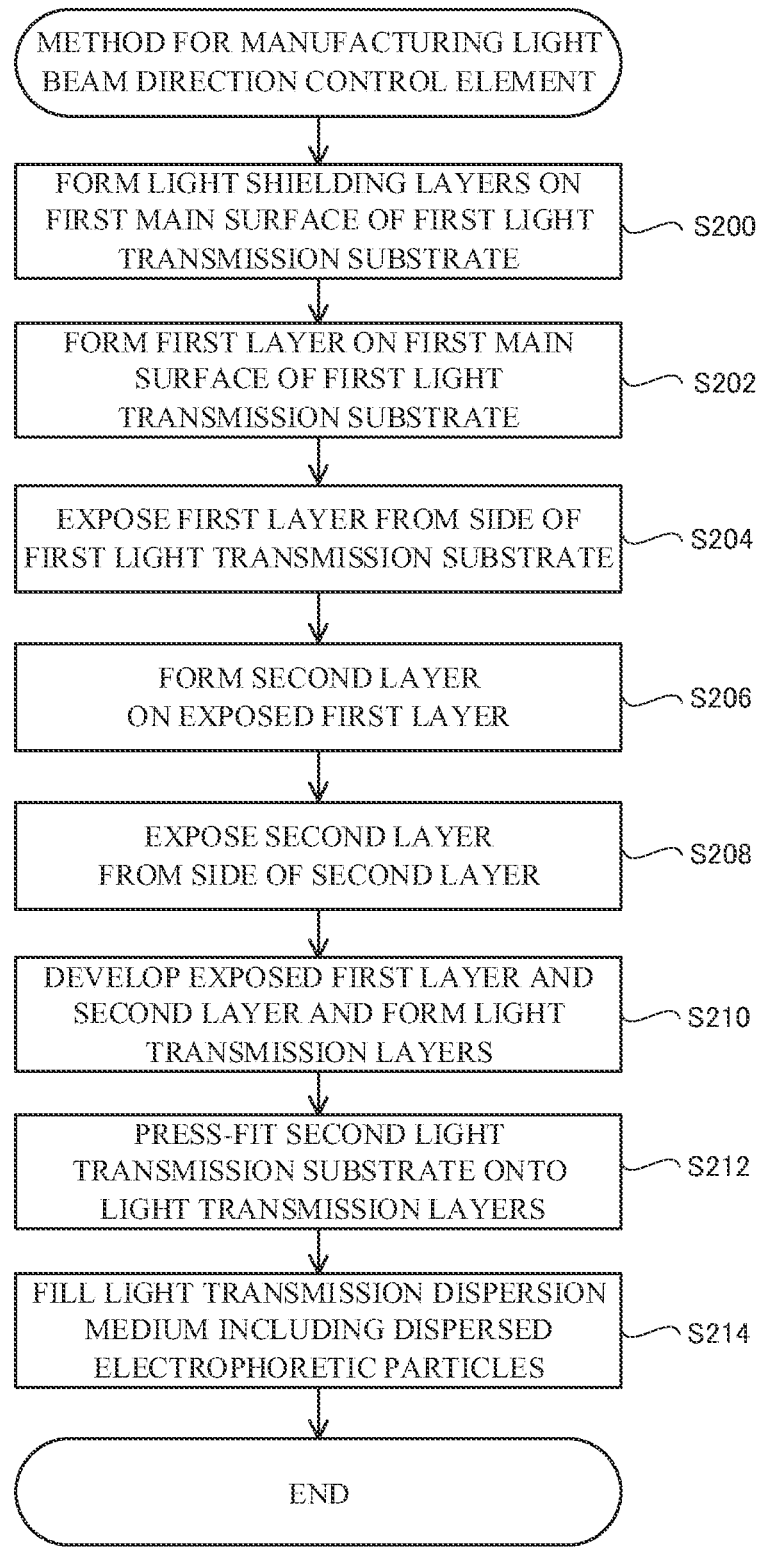
FIG. 20 is a flowchart illustrating a method for manufacturing the light beam direction control element according to Embodiment 6.

FIG. 20 is a flowchart illustrating a method for manufacturing the light beam direction control element 100 of the present embodiment. The method for manufacturing the light beam direction control element 100 of the present embodiment includes a step of forming light shielding layers 502 on the first main surface 10a of the first light transmission substrate 10 at a predetermined interval W1 (step S200), a step of stacking a first layer 504 made of a light transmission material having photosensitivity with a predetermined first thickness D51 (step S202), a step of exposing the first layer 504 from the first light transmission substrate 10 side (step S204), and a step of stacking, on the exposed first layer 504, a second layer 506 made of a light transmission material having photosensitivity with a predetermined second thickness D52 thicker than the predetermined first thickness D51 (step S206).

The method for manufacturing the light beam direction control element 100 of the present embodiment further includes a step of exposing a region 506a of the second layer 506 located between the light shielding layers 502 from the second layer 506 side with a width D22 narrower than a predetermined interval W1 between the light shielding layers 502 (step S208), a step of developing the exposed first layer 504 and the exposed second layer 506 and forming a plurality of light transmission layers 60 on the first main surface 10a of the first light transmission substrate 10 (step S210), a step of press-fitting the second light transmission substrate 20 onto the plurality of light transmission layers 60 (step S212), and a step of filling the light transmission dispersion medium 52, in which the electrophoretic particles 54 are dispersed, between the light transmission layers 60 (step S214).

Figure 21:
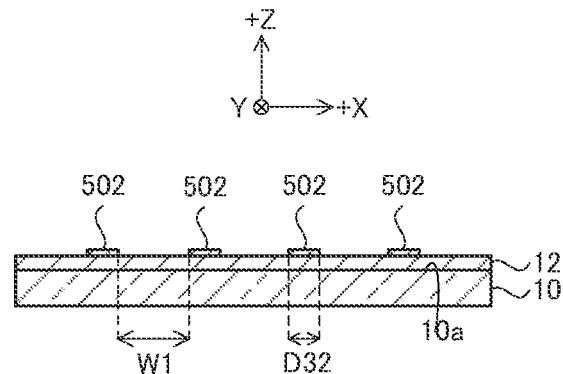
FIG. 21 is a schematic view illustrating a light shielding layer according to Embodiment 6.

At step S200, as illustrated in FIG. 21, a plurality of the light shielding layers 502 is formed on the first main surface 10a of the first light transmission substrate 10. The light shielding layers 502 are arranged in the X direction. The light shielding layer 502 blocks light for exposing light transmission materials forming the first layer 504 and the second layer 506. The light shielding layer 502 is made of chromium, aluminum, or the like. The light shielding layers 502 are formed at the predetermined interval W1 and each have a width D32 when viewed in XZ cross section. The predetermined interval W1 is equal to the width D1 of the first light transmission region 32 of the light beam direction control element 100. The width D32 is equal to the width D3 of the first light absorption regions 42, that is, the interval between the first light transmission regions 32. The predetermined interval W1 refers to the interval between the side surfaces of adjacent light shielding layers 502.

Figure 22:
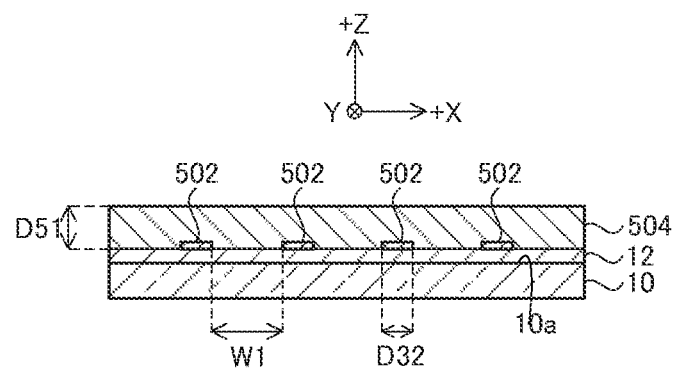
FIG. 22 is a schematic view illustrating a first layer according to Embodiment 6.

At step S202, the first layer 504 made of a light transmission material is stacked on the first main surface 10a of the first light transmission substrate 10 with a predetermined first thickness D51. The light transmission material has photosensitivity. As illustrated in FIG. 22, the first layer 504 is formed on the first main surface 10a of the first light transmission substrate 10 to cover the light shielding layers 502. The predetermined first thickness D51 is equal to the height H1 of the first light transmission regions 32 and the first light absorption regions 42. The light transmission material having photosensitivity is, for example, SU-8.

Figure 23:
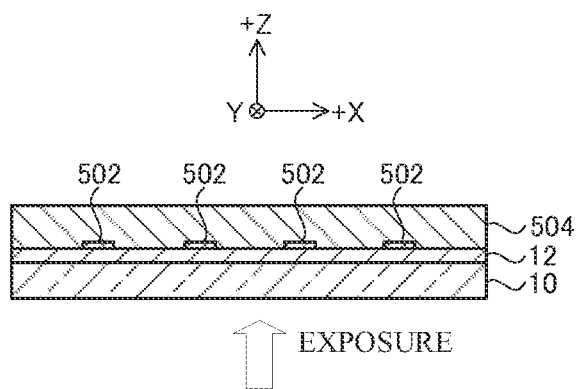
FIG. 23 is a schematic view illustrating exposure of the first layer according to Embodiment 6.

At step S204, first, the stacked first layer 504 is pre-baked (at 95° C. for 3 hours) in order to remove a solvent included in the stacked first layer 504. Subsequently, as illustrated in FIG. 23, the first layer 504 is exposed from the first light transmission substrate 10 side without using a mask. Since the thickness D51 of the first layer 504 is equal to the height H1 of the first light transmission region 32 and the first light absorption region 42 and the light shielding layers 502 each having the width D32 equal to the width D3 of the first light absorption region 42 are formed at the interval W1 equal to the width D1 of the first light transmission region 32 of the light beam direction control element 100, a region of the light beam direction control element 100 corresponding to the first light transmission region 32 is exposed.

At step S204, after the first layer 504 is exposed, a post exposure bake (PEB) process is performed (at 95° C. for 25 minutes).

Figure 24:
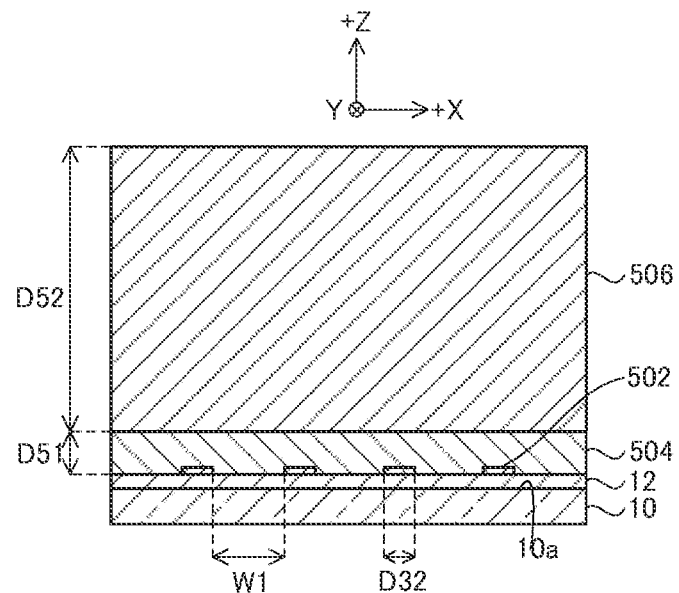
FIG. 24 is a schematic view illustrating a second layer according to Embodiment 6.

At step S206, as illustrated in FIG. 24, the second layer 506 made of a light transmission material is stacked on the exposed first layer 504 with the predetermined second thickness D52. The light transmission material forming the second layer 506 has photosensitivity. The light transmission material forming the second layer 506 and the light transmission material forming the first layer 504 may be the same as or different from each other. The predetermined second thickness D52 is equal to the height H2 of the second light transmission region 34 and the second light absorption region 44, and is thicker than the predetermined first thickness D51.

Figure 25:
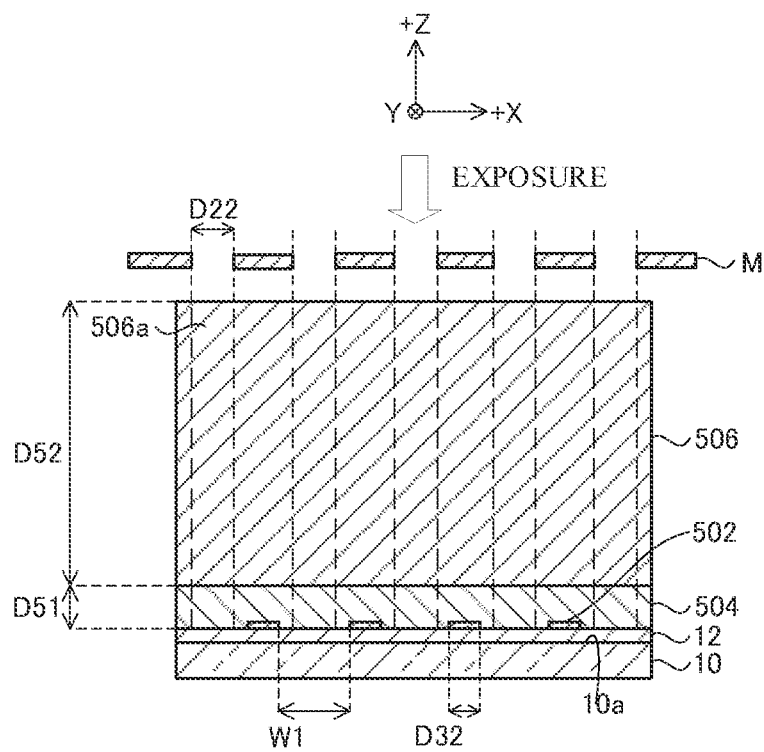
FIG. 25 is a schematic view illustrating exposure of the second layer according to Embodiment 6.

At step S208, first, the stacked second layer 506 is pre-baked (at 95° C. for 30 minutes). Subsequently, as illustrated in FIG. 25, the region 506a of the second layer 506 located between the light shielding layers 502 when viewed in plan view is exposed with the width D22 from the second layer 506 side by using a mask M. The width D22 is equal to the width D2 of the second light transmission region 34 and is narrower than the predetermined interval W1 of the light shielding layer 502. Since the thickness D52 of the second layer 506 is equal to the height H2 of the second light transmission region 34 and the second light absorption region 44 and the width D22 is equal to the width D2 of the second light transmission region 34, a region of the light beam direction control element 100 corresponding to the second light transmission region 34 is exposed.

At step S208, after the second layer 506 is exposed, a PEB process is performed (at 95° C. for 25 minutes).

Figure 26:
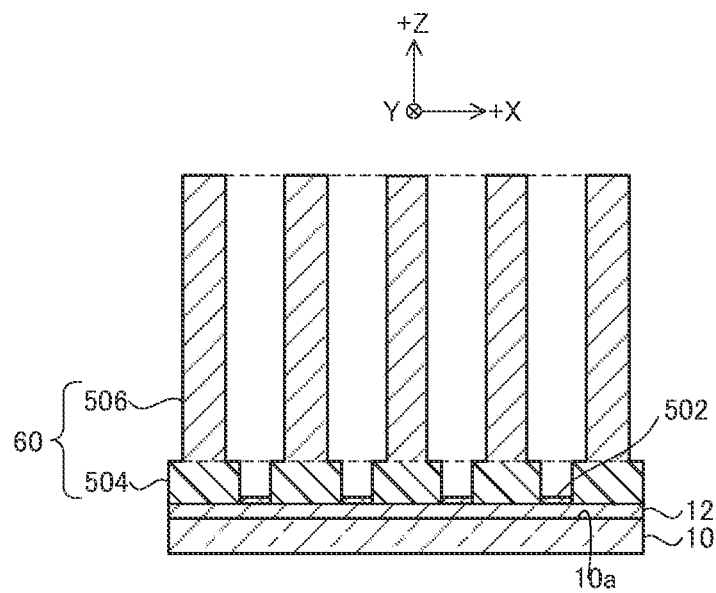
FIG. 26 is a schematic view illustrating a first light transmission substrate and a light transmission layer according to Embodiment 6.

At step S210, the exposed first layer 504 and the exposed second layer 506 are developed with a developer. After the development, the first layer 504 and the second layer 506 are rinsed with a rinse solution and post-baked (at 150° C. for 30 minutes). Thus, as illustrated in FIG. 26, the plurality of light transmission layers 60 is formed on the first main surface 10a of the first light transmission substrate 10.

In the present embodiment, a region of the first layer 504 corresponding to the first light transmission region 32 is exposed at step S204, and a region of the second layer 506 corresponding to the second light transmission region 34 is exposed at step S208. Therefore, in this step, the light transmission layers 60 of the light beam direction control element 100 corresponding to the light transmission regions 30 are formed on the first main surface 10a of the first light transmission substrate 10.

Steps S212 and S214 of the present embodiment are the same as steps S110 and S112 of Embodiment 1.

By the above, the light beam direction control element 100 can be manufactured. At step S204 of the present embodiment, regions of the first layer 504 corresponding to the first light transmission regions 32 are exposed from the first light transmission substrate 10 side. Thus, the first layer 504 is exposed through the light shielding layers 502 each having the width D32 equal to the interval between the first light transmission regions 32 (width D3 of the first light absorption region 42), so that portions corresponding to the first light transmission regions 32 and arranged at a narrow interval (width D3 of the first light absorption region 42) can be easily formed and the light beam direction control element 100 can be easily manufactured. In the light beam direction control element 100 of the present embodiment, the light shielding layers 502 exist on the first main surface 10a of the first light transmission substrate 10. Since the light shielding layer 502 is located in the light absorption region 40, the light shielding layer 502 does not affect the characteristics of the light beam direction control element 100.

Modification

Although the embodiments have been described above, the present disclosure can be modified in various ways without departing from the spirit of the disclosure.

For example, the first light transmission substrate 10 and the second light transmission substrate 20 may each be made of light transmission resin. The electrophoretic particles 54 may be positively charged.

In the embodiment, the mold 400 is produced using a known photolithographic technique. The mold 400 may be produced by cutting metal (for example, silicon). The mold 400 may also be a plated nickel (Ni) mold, copper (Cu) mold, or the like.

In the embodiment, the pillar 420 is made of chemically amplified photoresist: SU-8. The pillar 420 may be made of another resist. For example, the pillar 420 may be made of negative resist: KMPR (trade name, Nippon Kayaku Co., Ltd.). The pillar portion 420 may also be formed using dry film resist.

In the embodiment, thermosetting silicone resin is used as the light transmission resin 450. The light transmission resin 450 may be thermosetting epoxy resin, thermosetting acrylic resin, or the like.

The light transmission resin 450 may also be ultra violet (UV) curable resin (silicon resin, epoxy resin, acrylic resin, or the like). When the UV curable resin is used as the light transmission resin 450, the light transmission resin 450 is irradiated with UV light from the first light transmission substrate 10 side or the second light transmission substrate 20 side, so that the light transmission resin 450 is cured (step S106).

Figure 27:
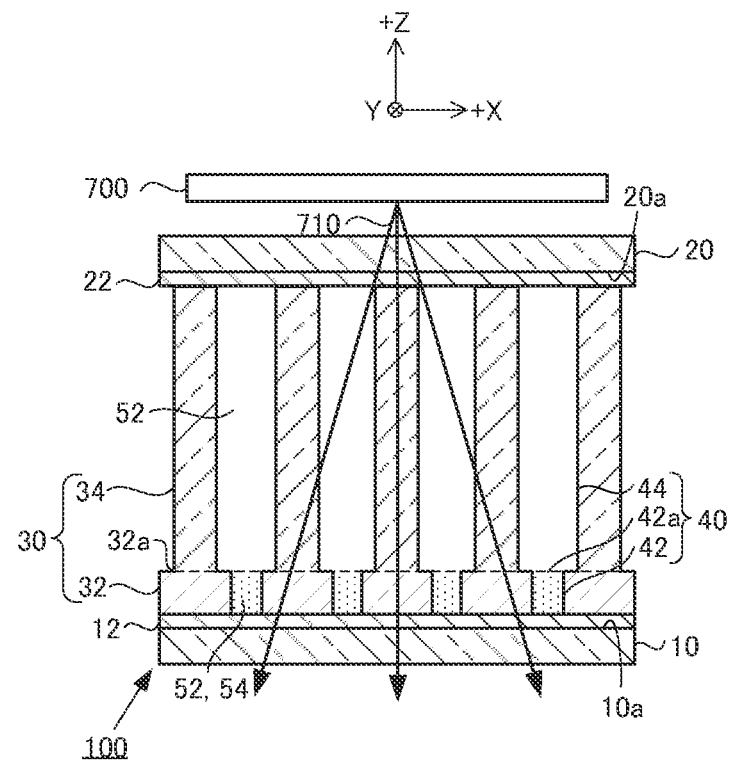
FIG. 27 is a schematic view illustrating a light beam direction control element according to a modification.

In the embodiment, the light 710 incident on the light beam direction control element 100 is incident on the light beam direction control element 100 from the first light transmission substrate 10 side (−Z side). As illustrated in FIG. 27, the light 710 may also be incident on the light beam direction control element 100 from the second light transmission substrate 20 side (+Z side). In this case, the light beam direction control element 100 controls the angular distribution of the light 710 incident from the +Z direction and emits the light 710 in the −Z direction.

In one example of Embodiment 1, the first light absorption region 42 can be filled with the electrophoretic particles 54 up to 21.8 μm of the height H1 (25 μm) thereof. In the first wide field-of-view mode, the first light absorption region 42 may be filled with the electrophoretic particles 54 up to a height equal to or less than the height H1 thereof.

In the embodiment, the light beam direction control element 100 operates in the first wide field-of-view mode, the second wide field-of-view mode, and the narrow field-of-view mode. The light beam direction control element 100 may operate in the first wide field-of-view mode and the narrow field-of-view mode. The light beam direction control element 100 may also operate in the second wide field-of-view mode and the narrow field-of-view mode.

When the light beam direction control element 100 operates in the second wide field-of-view mode and the narrow field-of-view mode, the electrophoretic particles 54 dispersed in the light transmission dispersion medium 52 may have a concentration or volume with which the first light absorption region 42 and the region 46 of the second light absorption region 44 are filled with the electrophoretic particles 54 in a state in which a voltage equal to or greater than the predetermined second voltage is applied.

In Embodiment 3, the second light transmission region 34 has a trapezoidal shape when viewed in XZ cross section. In Embodiment 4, the first light transmission region 32 has a trapezoidal shape. When viewed in XZ cross section, the first light transmission region 32 and the second light transmission region 34 may each have a trapezoidal shape.

Figure 28:
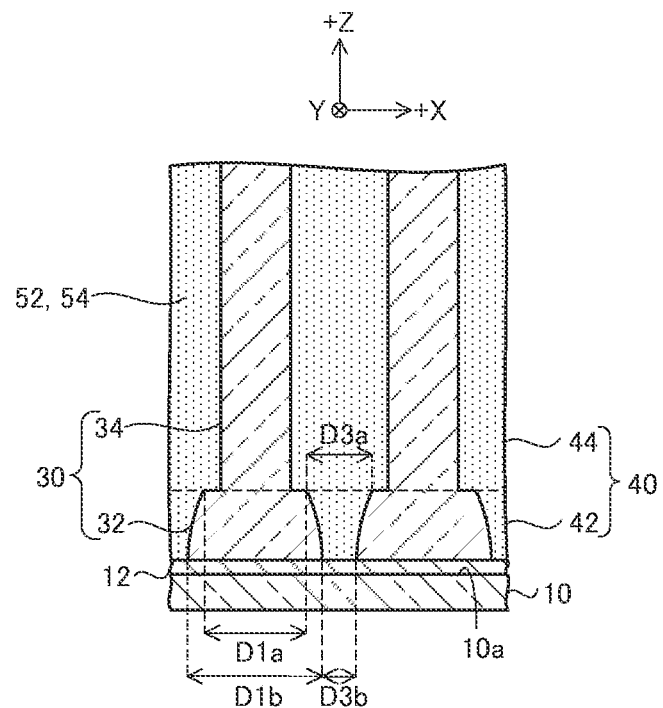
FIG. 28 is a schematic view illustrating a first light transmission region according to a modification.
Figure 29:
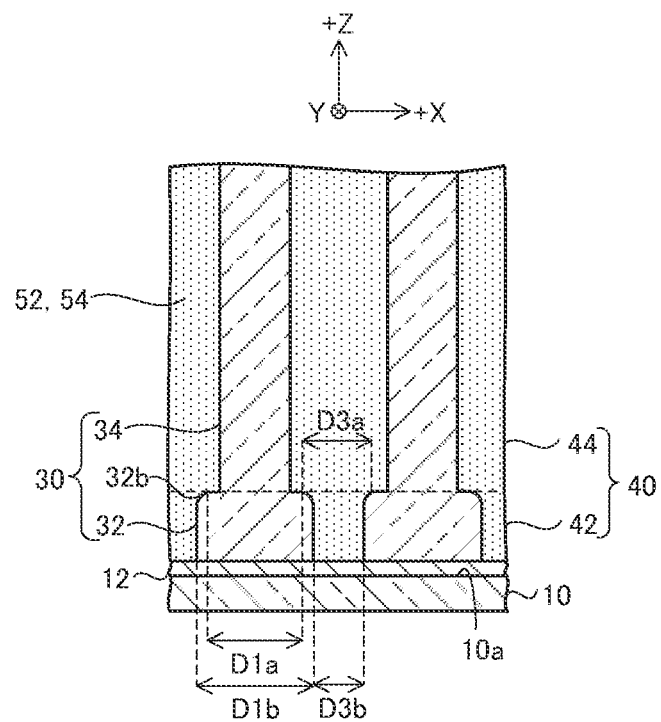
FIG. 29 is a schematic view illustrating a first light transmission region according to a modification.

Although the side surface of the first light transmission region 32 in Embodiment 1 to Embodiment 4 are planar, the side surface of the first light transmission region 32 may be curved as illustrated in FIG. 28. For example, the width D1b on the −Z side of the first light transmission region 32 is 47 μm and the width D3b on the −Z side of the first light absorption region 42 is 3 μm. A corner 32b of the first light transmission region 32 may be curved as illustrated in FIG. 29.

Figure 30:
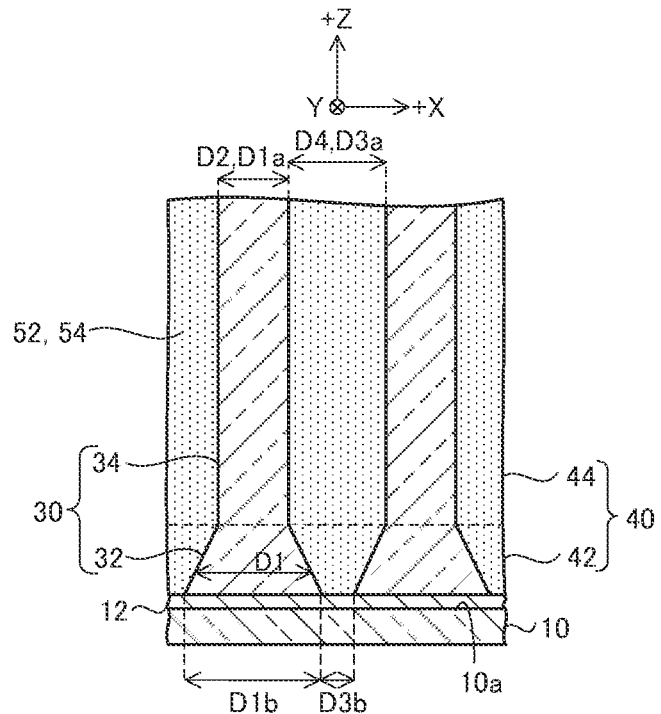
FIG. 30 is a schematic view illustrating a first light transmission region according to a modification.
Figure 31:
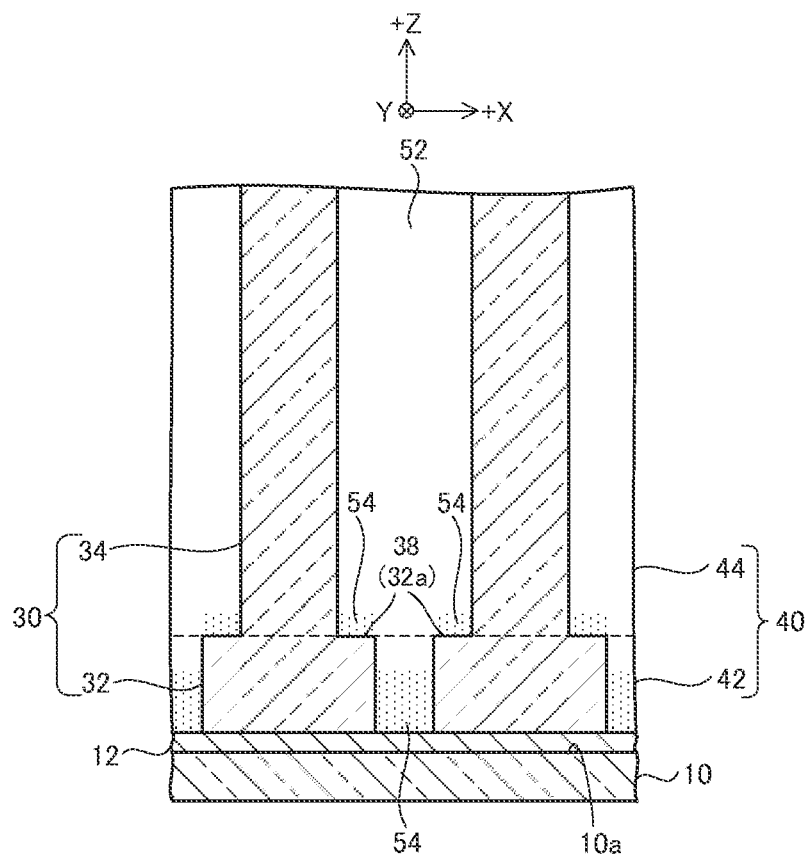
FIG. 31 is a schematic view for explaining remaining of electrophoretic particles.

In the first light transmission region 32 having a trapezoidal shape, as illustrated in FIG. 30, the width D1b on the −Z side may be wider than the width D1a on the +Z side, and the width D1a on the +Z side of the first light transmission region 32 may be equal to the width (width on the −Z side) D2 of the second light transmission region 34. Thus, the width D1 of the first light transmission region 32 is continuously widened from the width (width on the −Z side) D2 of the second light transmission region 34 to the width D1b on the −Z side toward the first light transmission substrate 10. Since the width D1 of the first light transmission region 32 is continuously widened from the width D2 of the second light transmission region 34 to the width D1b on the −Z side toward the first light transmission substrate 10, a part of the electrophoretic particles 54 can be prevented from remaining on a stepped portion 38 (upper surface 32a of the first light transmission region 32) between the first light transmission region 32 and the second light transmission region 34 in the first wide field-of-view mode as illustrated in FIG. 31. By suppressing remaining of the electrophoretic particles 54, the transmittance of the light beam direction control element 100 in the first wide field-of-view mode can be further increased.

Figure 32:
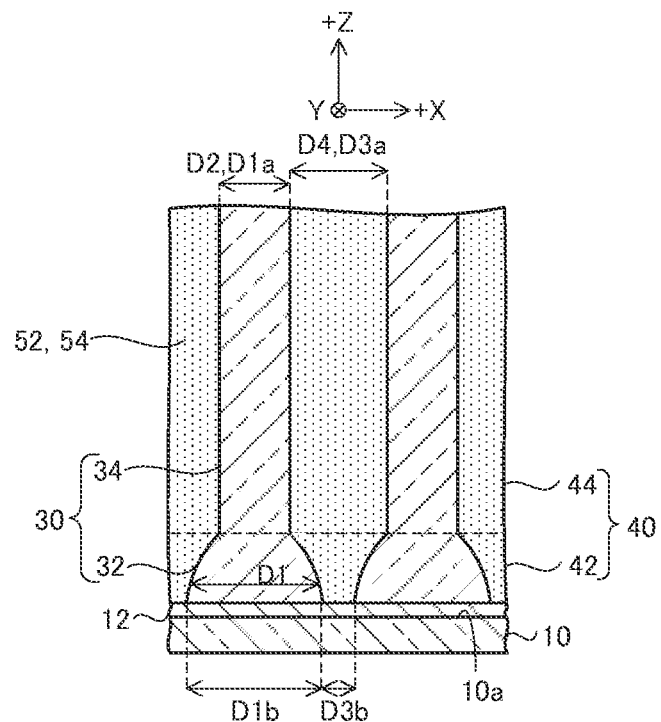
FIG. 32 is a schematic view illustrating a first light transmission region according to a modification.
Figure 33:
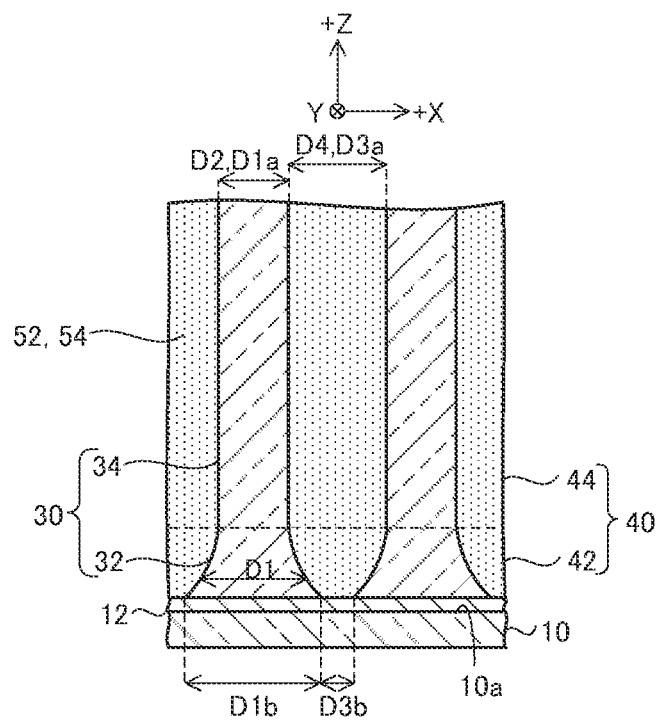
FIG. 33 is a schematic view illustrating a first light transmission region according to a modification.

It is sufficient if the stepped portion 38 between the first light transmission region 32 and the second light transmission region 34 does not exist. For example, the side surface of the first light transmission region 32 in the above-described modification (FIG. 30) is planar, but the side surface of the first light transmission region 32 may be curved as illustrated in FIGS. 32 and 33. Also in the present modification, the width D1b on the −Z side is wider than the width D1a on the +Z side, and the width D1a on the +Z side of the first light transmission region 32 is equal to the width (width on the −Z side) D2 of the second light transmission region 34. The width D1 of the first light transmission region 32 is continuously widened from the width (the width on the −Z side) D2 of the second light transmission region 34 to the width D1b on the −Z side toward the first light transmission substrate 10. Also in the present modification, similarly to the above-described modification, the stepped portion 38 between the first light transmission region 32 and the second light transmission region 34 can be eliminated, and remaining of the electrophoretic particles 54 can be suppressed. By suppressing remaining of the electrophoretic particles 54, the transmittance of the light beam direction control element 100 in the first wide field-of-view mode can be further increased.

Figure 34:
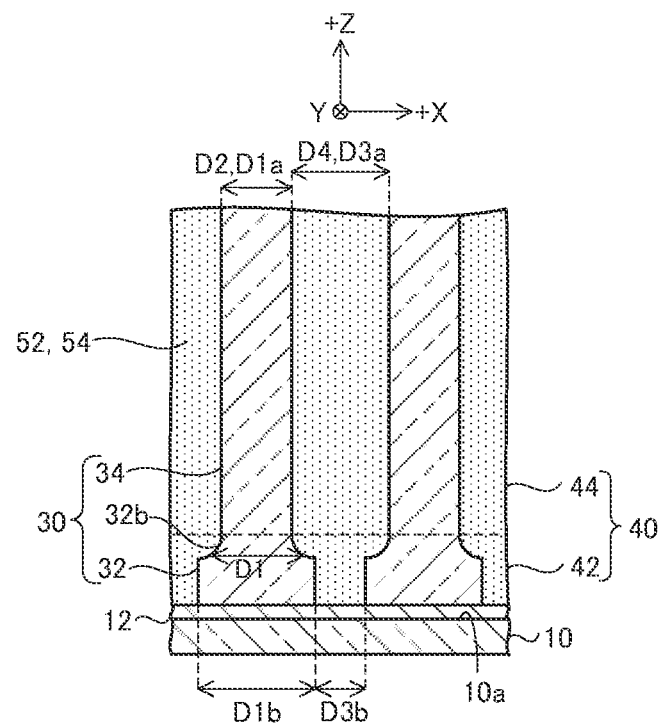
FIG. 34 is a schematic view illustrating a first light transmission region according to a modification.

Moreover, as illustrated in FIG. 34, the stepped portion 38 between the first light transmission region 32 and the second light transmission region 34 may also be eliminated by notching the corner 32*b* of the first light transmission region 32 in a curved shape. Also in the present modification, the width D1 of the first light transmission region 32 is continuously widened from the width (the width on the −Z side) D2 of the second light transmission region 34 to the width D1*b* on the −Z side toward the first light transmission substrate 10. Also in present modification, remaining of the electrophoretic particles 54 can be suppressed. By suppressing remaining of the electrophoretic particles 54, the transmittance of the light beam direction control element 100 in the first wide field-of-view mode can be further increased.

Figure 35:
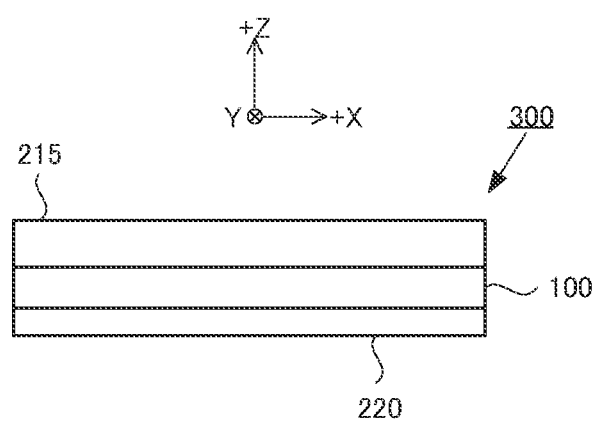
FIG. 35 is a schematic view illustrating a display device according to a modification.

The display device 300 may include the light beam direction control element 100, a transmissive liquid crystal display panel 215, and a backlight 220 as illustrated in FIG. 35. The backlight 220 is disposed on an opposite side of a display surface of the transmissive liquid crystal display panel 215 and supplies light to the transmissive liquid crystal display panel 215. The light beam direction control element 100 is disposed between the transmissive liquid crystal display panel 215 and the backlight 220 and controls the angular distribution of light supplied from the backlight 220 to the transmissive liquid crystal display panel 215.

Figure 36:
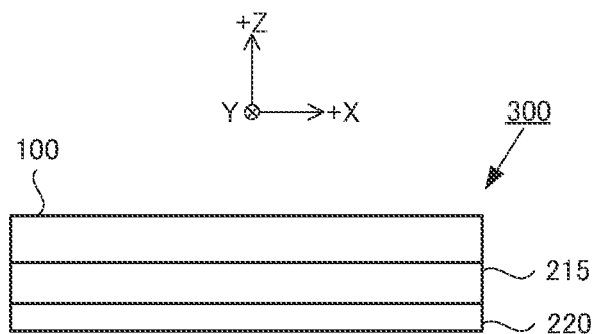
FIG. 36 is a schematic view illustrating a display device according to a modification.

As illustrated in FIG. 36, the light beam direction control element 100 may be disposed on the display surface of the transmissive liquid crystal display panel 215.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A light beam direction control element, comprising:
    a first light transmission substrate including a first light transmission electrode on a main surface;
    a second light transmission substrate facing the first light transmission substrate and including a second light transmission electrode on a main surface facing the main surface of the first light transmission substrate;
    a plurality of light transmission regions arranged in a predetermined direction and interposed between the first light transmission substrate and the second light transmission substrate;
    a plurality of light absorption regions located between the light transmission regions;
    a light transmission dispersion medium enclosed in the light absorption regions; and
    electrophoretic particles absorbing light, dispersed in the light transmission dispersion medium, and having a dispersion state changed by an applied voltage, wherein
    each of the light transmission regions includes a first light transmission region extending perpendicularly to the main surface of the first light transmission substrate from the main surface of the first light transmission substrate toward the second light transmission substrate and a second light transmission region extending perpendicularly to the main surface of the first light transmission substrate from an upper surface of the first light transmission region toward the second light transmission substrate,
    each of the light absorption regions includes a first light absorption region located between the first light transmission regions and a second light absorption region located between the second light transmission regions,
    a height of the first light transmission region from the main surface of the first light transmission substrate is lower than a height of the second light transmission region from the upper surface of the first light transmission region, and
    when viewed in a cross section including the predetermined direction and perpendicular to the main surface of the first light transmission substrate, a width of the first light transmission region is wider than a width of the second light transmission region.

2. The light beam direction control element according to claim 1, wherein, when a predetermined first voltage is applied between the first light transmission electrode and the second light transmission electrode, the electrophoretic particles are collected in the first light absorption region.

3. The light beam direction control element according to claim 1, wherein, when a predetermined second voltage is applied between the first light transmission electrode and the second light transmission electrode, the electrophoretic particles are collected on a side of the first light transmission substrate.

4. The light beam direction control element according to claim 1, wherein a ratio of the height of the first light transmission region from the main surface of the first light transmission substrate to the height of the second light transmission region from the upper surface of the first light transmission region is 1:2.6 or more.

5. The light beam direction control element according to claim 1, wherein the width of the first light transmission region is continuously widened from the width of the second light transmission region toward the first light transmission substrate.

6. A display device, comprising:
    the light beam direction control element according to claim 1; and
    a display panel,
    wherein the light beam direction control element is disposed on a display surface of the display panel.

7. A display device, comprising:
    the light beam direction control element according to claim 1;
    a transmissive liquid crystal display panel; and
    a backlight disposed on an opposite side of a display surface of the transmissive liquid crystal display panel and supplying light to the transmissive liquid crystal display panel,
    wherein the light beam direction control element is disposed between the transmissive liquid crystal display panel and the backlight.

8. A method for manufacturing a light beam direction control element, the method comprising:
    preparing a mold including a mold substrate, a plurality of first pillars provided on a main surface of the mold substrate perpendicularly to the main surface and arranged in a predetermined direction, and a second pillar provided on an upper surface of each of the plurality of first pillars perpendicularly to the main surface of the mold substrate;
    filling the mold with light transmission resin;

pressing a main surface of a first light transmission substrate against the second pillars and the light transmission resin exposed from between the second pillars, the first light transmission substrate including a first light transmission electrode on the main surface of the first light transmission substrate;

curing the light transmission resin pressed against the main surface of the first light transmission substrate;

releasing the mold from the cured light transmission resin and forming a plurality of light transmission layers on the main surface of the first light transmission substrate, the plurality of light transmission layers including a first light transmission layer having a shape corresponding to a shape of a space between the adjacent second pillars and a second light transmission layer having a shape corresponding to a shape of a space between the adjacent first pillars;

press-fitting a second light transmission substrate facing the first light transmission substrate onto the plurality of light transmission layers, the second light transmission substrate including a second light transmission electrode on a main surface facing the main surface of the first light transmission substrate; and filling a light transmission dispersion medium including dispersed electrophoretic particles between the light transmission layers, the electrophoretic particles absorbing light and having a dispersion state changed by an applied voltage, wherein a height of the space between the adjacent second pillars is lower than a height of the space between the adjacent first pillars, and when viewed in a cross section including the predetermined direction and perpendicular to the main surface of the mold substrate, a width of the space between the adjacent second pillars is wider than a width of the space between the adjacent first pillars.

9. A method for manufacturing a light beam direction control element, the method comprising:

forming light shielding layers on a main surface of a first light transmission substrate at a predetermined interval, the first light transmission substrate including a first light transmission electrode on the main surface;

stacking, on the main surface of the first light transmission substrate, a first layer with a predetermined first thickness, the first layer being made of a light transmission material having photosensitivity and covering the light shielding layers;

exposing the first layer from a side of the first light transmission substrate;

stacking, on the exposed first layer, a second layer with a predetermined second thickness thicker than the predetermined first thickness, the second layer being made of a light transmission material having photosensitivity;

exposing a region of the second layer located between the light shielding layers when viewed in plan view from a side of the second layer with a width narrower than the predetermined interval between the light shielding layers;

developing the exposed first layer and the exposed second layer and forming a plurality of light transmission layers on the first main surface of the first light transmission substrate;

press-fitting a second light transmission substrate facing the first light transmission substrate onto the plurality of light transmission layers, the second light transmission substrate including a second light transmission electrode on a main surface facing the main surface of the first light transmission substrate; and filling a light transmission dispersion medium including dispersed electrophoretic particles between the light transmission layers, the electrophoretic particles absorbing light and having a dispersion state changed by an applied voltage.

* * * * *